United States Patent [19]

Yoshikawa

[11] Patent Number: 5,400,980
[45] Date of Patent: Mar. 28, 1995

[54] TAPE DRIVING APPARATUS

[75] Inventor: Akira Yoshikawa, Nara, Japan

[73] Assignee: Matsushita Electric Industrial Co., Ltd., Osaka, Japan

[21] Appl. No.: 159,472

[22] Filed: Nov. 30, 1993

Related U.S. Application Data

[62] Division of Ser. No. 795,960, Nov. 21, 1991, Pat. No. 5,330,118.

[30] Foreign Application Priority Data

Nov. 27, 1990 [JP] Japan .................. 2-328660
Jun. 5, 1991 [JP] Japan .................. 3-134083

[51] Int. Cl.⁶ .................................. B65H 77/00
[52] U.S. Cl. ........................ 242/334; 242/334.2; 242/334.5
[58] Field of Search ............. 242/186, 191, 75.5, 242/75.51, 75.52, 334, 334.2, 334.5; 318/6, 7; 360/73.04, 73.09, 96.2, 96.3, 96.9

[56] References Cited

U.S. PATENT DOCUMENTS

| | | | |
|---|---|---|---|
| 4,015,799 | 4/1977 | Koski et al. | 242/203 |
| 4,125,881 | 11/1978 | Eige et al. | 242/186 X |
| 4,398,227 | 8/1983 | Anderson | 242/188 X |
| 4,448,368 | 5/1984 | Skalko | 242/186 |
| 4,461,433 | 7/1984 | Kani | 242/75.51 |
| 4,525,654 | 6/1985 | Tajima et al. | 242/75.51 X |
| 4,664,336 | 5/1987 | Koyama | 242/186 |
| 4,743,811 | 5/1988 | Katayama | 318/7 |
| 4,788,606 | 11/1988 | Uchikoshi | 242/186 X |
| 4,817,887 | 4/1989 | Harigaya et al. | 242/186 |
| 5,039,027 | 8/1991 | Yamagihara et al. | 242/190 |
| 5,085,379 | 2/1992 | Uchikoshi et al. | 242/186 |
| 5,222,684 | 6/1993 | Yoneda et al. | 242/186 |
| 5,248,112 | 9/1993 | Rodal et al. | 242/207 |
| 5,259,563 | 11/1993 | Kakiwaki et al. | 242/186 X |

FOREIGN PATENT DOCUMENTS

| | | |
|---|---|---|
| 0240437A3 | 10/1987 | European Pat. Off. |
| 2503911 | 10/1982 | France |
| 57-169956 | 10/1982 | Japan |
| 57-203247 | 12/1982 | Japan |

Primary Examiner—Daniel P. Stodola
Assistant Examiner—John P. Darling
Attorney, Agent, or Firm—Stevens, Davis, Miller & Mosher

[57] ABSTRACT

A tape driving apparatus includes circuits for driving a supply reel and a take-up reel, circuits for detecting tape radii on the reels, a circuit for producing take-up side torque information and controlling the take-up reel, a circuit for setting a determining a coefficient of feed torque for the supply reel in accordance with the tape radius information of the supply or take-up reel, a circuit for determining feed torque information of the supply reel from the take-up side torque information, the tape radius information of the supply and take-up reel and the determining coefficient of the feed torque, a circuit for determining back torque information proportional to the tape radius information of the supply reel, a circuit for outputting a torque information change-over signal on the basis of a mode change-over command, the feed torque information and the back torque information, and a circuit for sending either one of the feed torque information and the back torque information to the supply reel driving circuit on the basis of the torque information changeover signal. The roles of the take-up and supply reels can be reversed as needed.

12 Claims, 28 Drawing Sheets

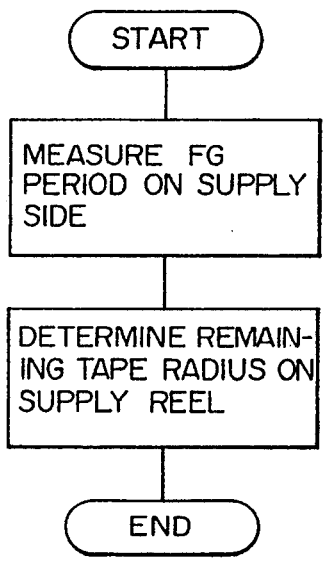
FIG. 2A
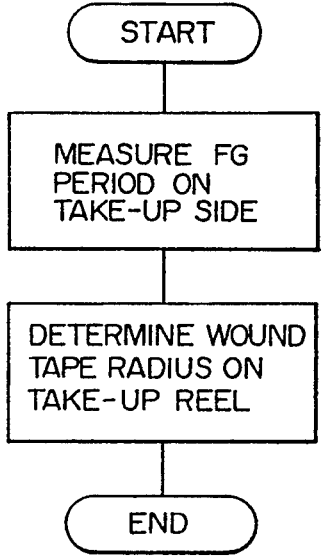
FIG. 2B
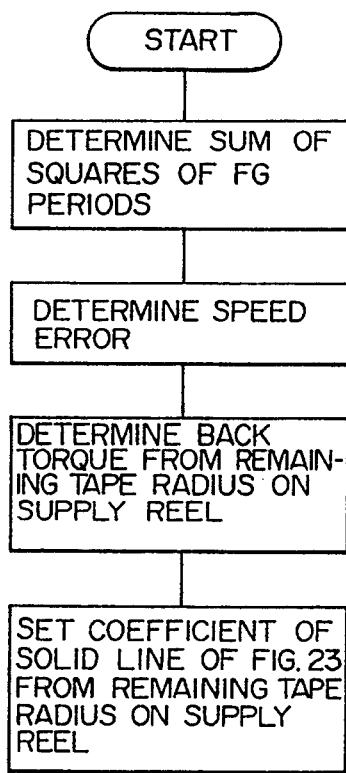
FIG. 2C
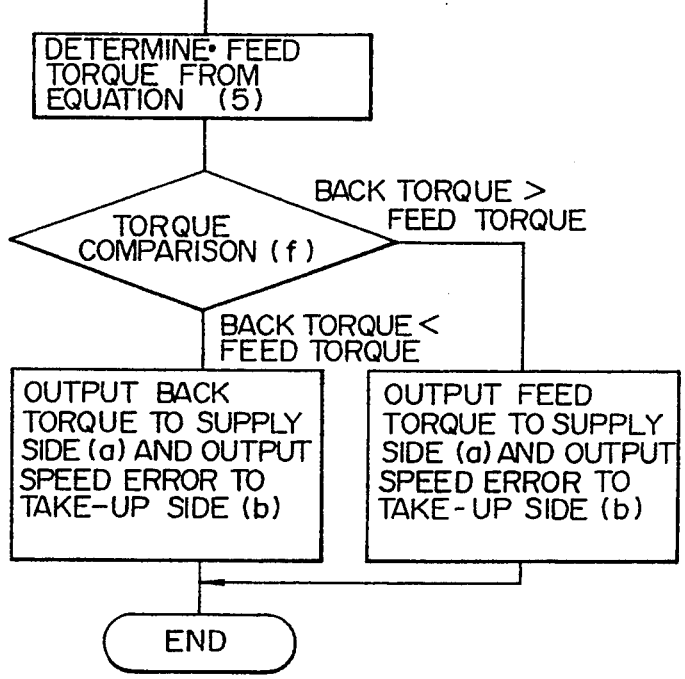

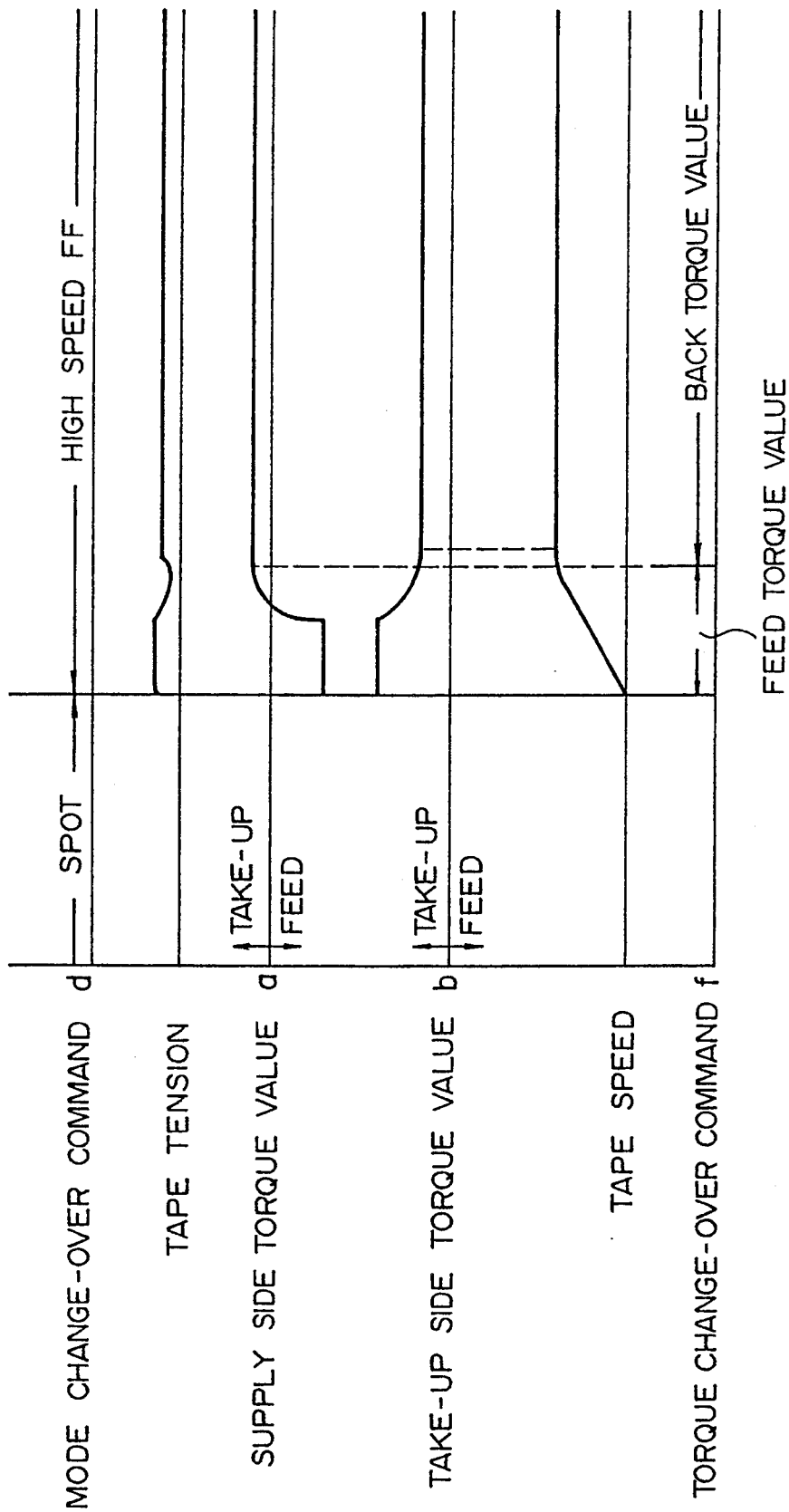

PROCESSING A

PROCESSING B

PROCESSING C

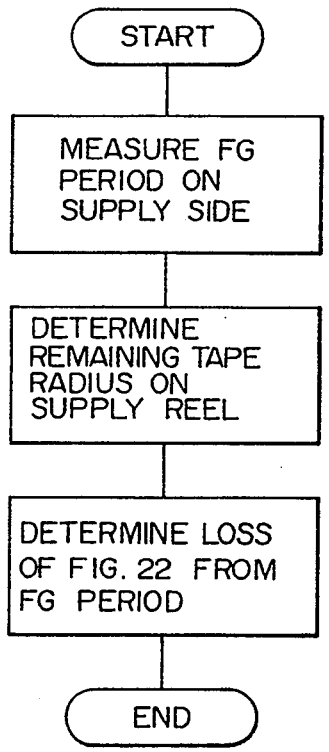
FIG. 8A PROCESSING A
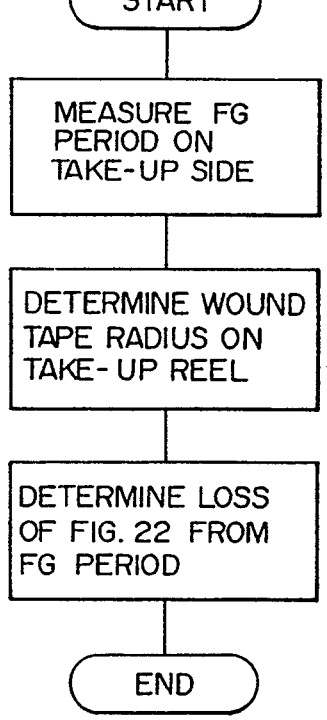
FIG. 8B PROCESSING B
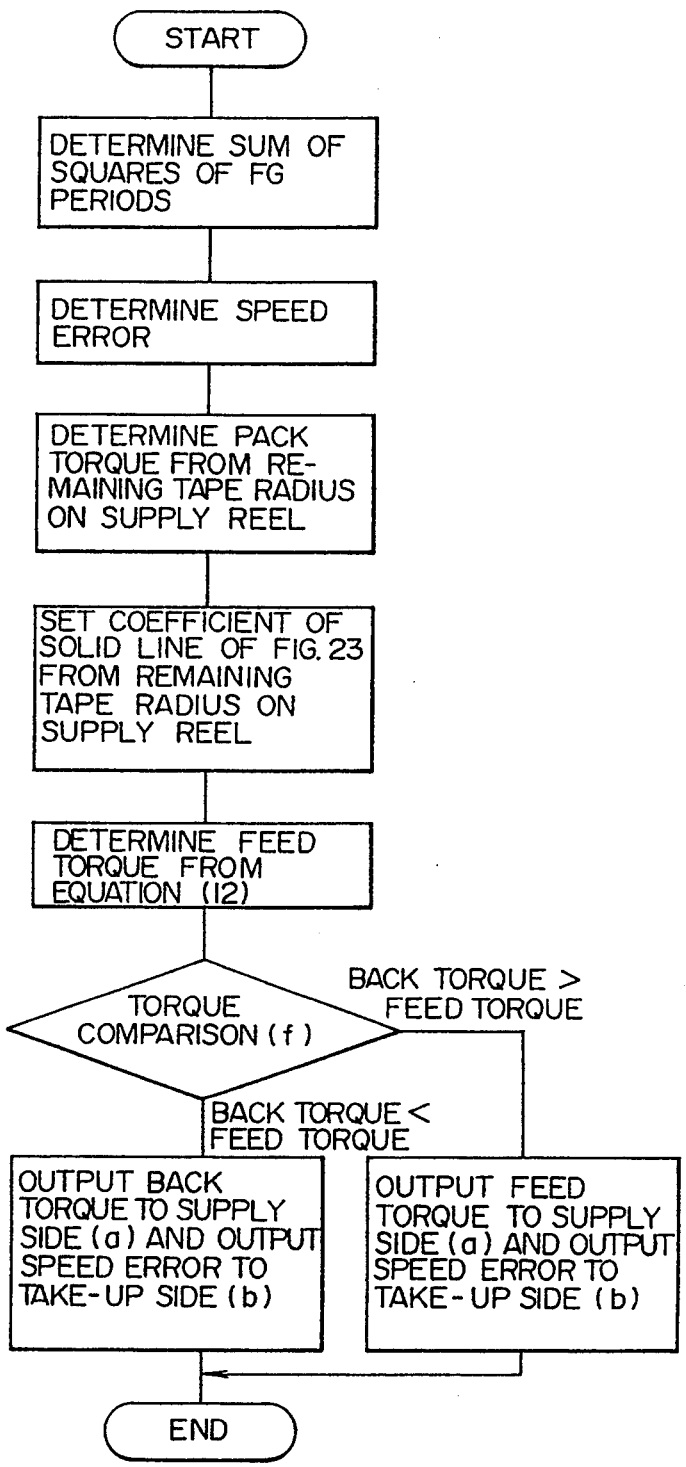
FIG. 8C PROCESSING C

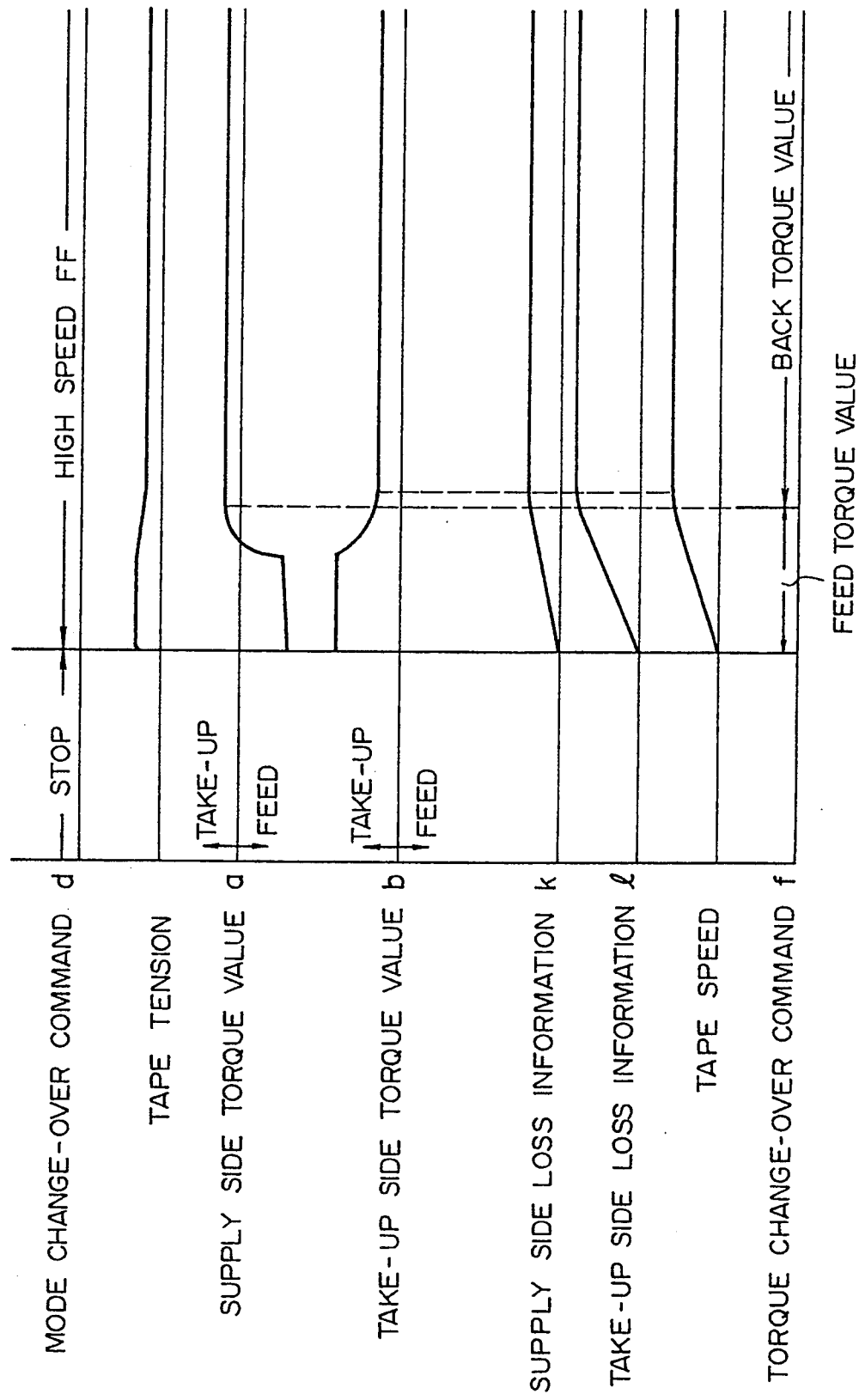

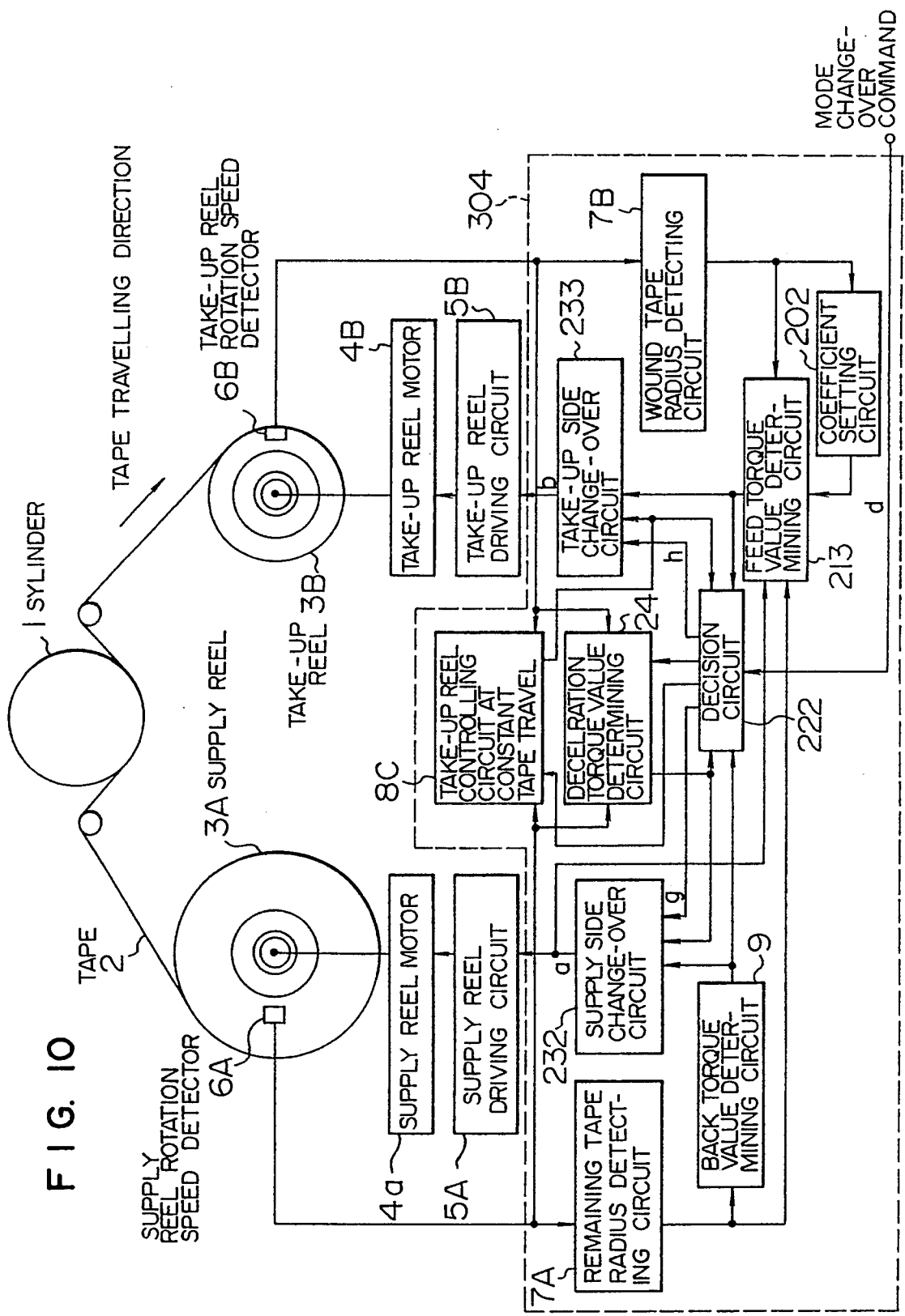

F I G. 17A
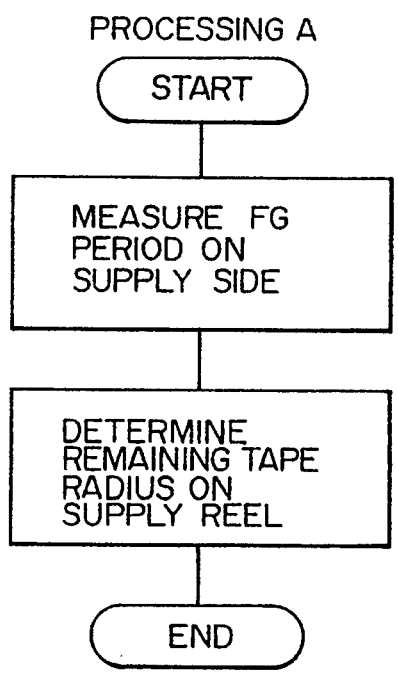
F I G. 17B
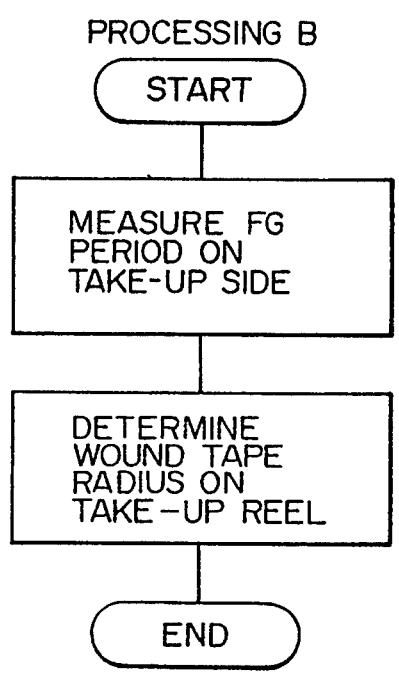

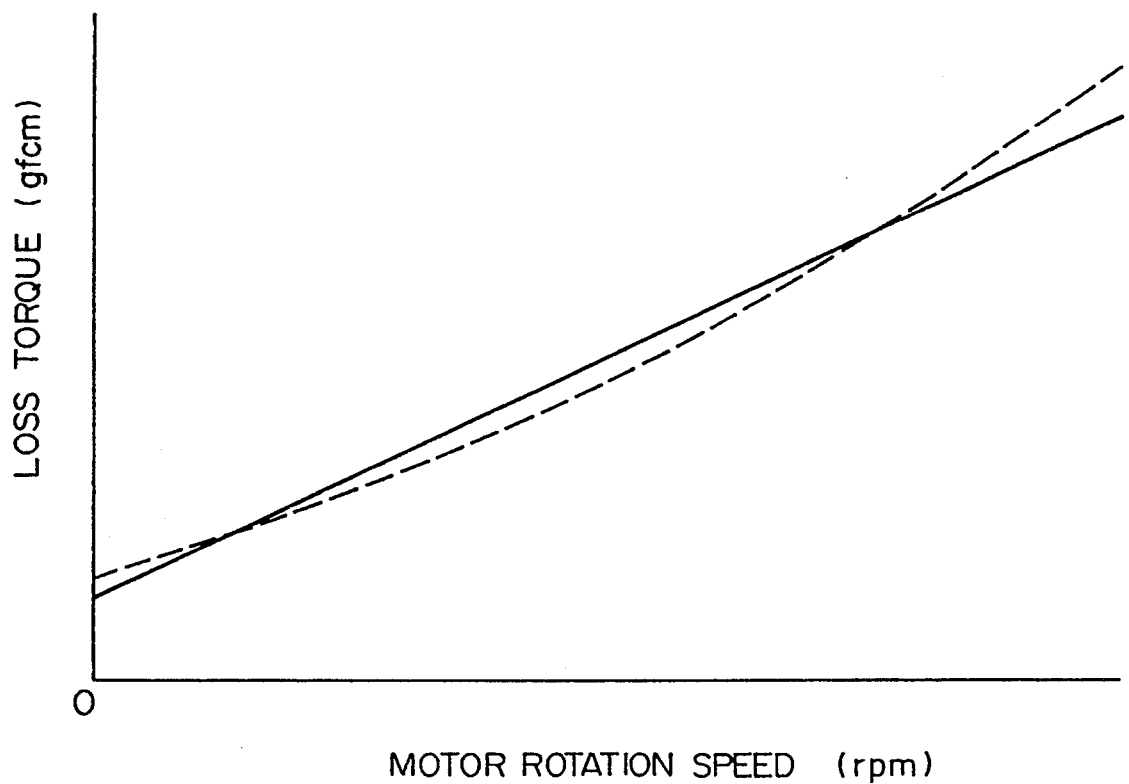
F I G. 22

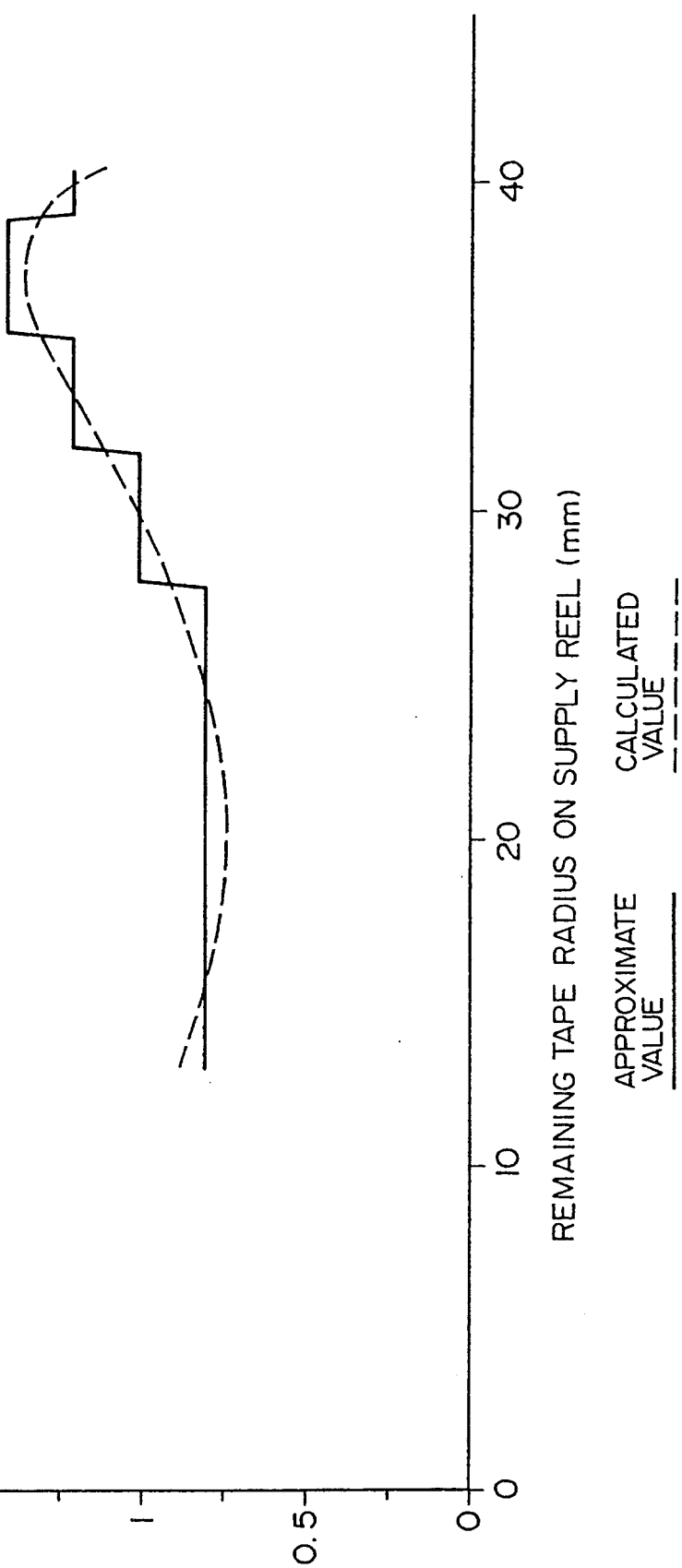

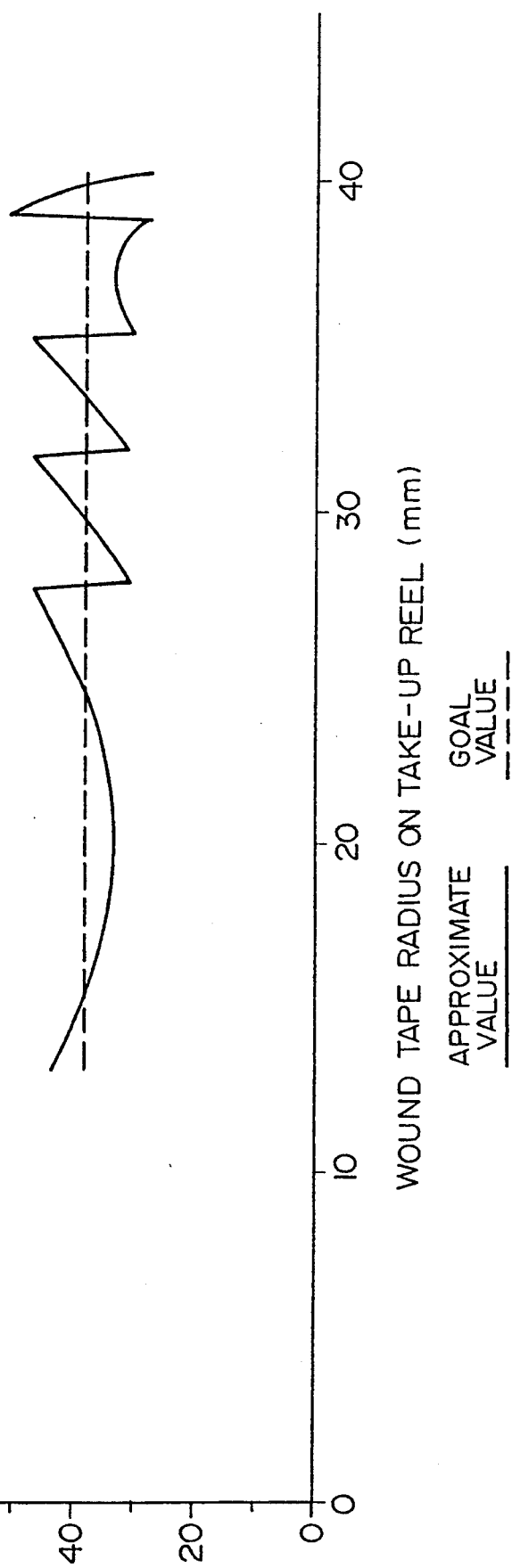

TAPE DRIVING APPARATUS

This is a division of application Ser. No. 07/795,960, filed Nov. 21, 1991, now U.S. Pat. No. 5,330,118.

BACKGROUND OF THE INVENTION

1. Field of the Invention

The present invention relates to a tape driving apparatus for controlling the transportation of a lengthy tape such as a magnetic tape by a supply reel and a take-up reel, and more particularly to a tape driving apparatus which can make a tape travel control at a rapid response speed without causing tape damage.

2. Description of Related Art

In recent years, tape driving apparatuses have remarkably been popularized and are used in various ways by various people. In such circumstances, tape driving apparatuses are required which have a high-speed operating ability as basic performance and are easy to use and which do not damage magnetic tapes or the like as recording media.

One of conventional tape driving apparatuses satisfying the above requirements has been proposed by JP-A-57-169956. In the following, explanation will be made of a VTR as a typical example.

In the conventional tape driving apparatus, high-speed start stop is realized with no tape damage by supplying a predetermined motor torque to each of supply and take-up reels. For this purpose, the tape radius on each reel, the tape acceleration and the tape tension on each of the tape supply and take-up sides are detected by means of a plurality of detectors to determine the moment of inertia of each reel and to control the reel motors. The optimum motor torque to each of the supply and take-up reels is determined on the basis of the determined moment of inertia of each reel and an output of each detector. This principle will now be explained.

The moments $I_S$ and $I_T$ of inertia of the supply and take-up reels are determined using the following equations:

$$I_S = \frac{\gamma_S}{\alpha}(-T_{SO} + \gamma_S F_S)$$

and $$I_T = \frac{\gamma_T}{\alpha}(T_{TO} - \gamma_T F_T)$$

where $\gamma_S$ and $\gamma_T$ are the tape radii on the supply and take-up reels, $\alpha$ is the tape acceleration, $T_{SO}$ and $T_{TO}$ are the initial torques generated by the supply and take-up reel motors, and $F_S$ and $F_T$ are the tape tensions on the tape supply and take-up sides. Here and elsewhere in the specification, unless otherwise noted, the convention is observed that for torque $T_S$ or $T_{SO}$ generated by the supply reel motor and angular velocity $\omega_S$ of the supply reel, the positive direction is that of left-handed revolution, while for torque $T_T$ or $T_{TO}$ generated by the take-up reel motor and angular velocity $\omega_T$ of the take-up reel, the positive direction is that of right-handed rotation.

Next, using the moments of inertia $I_S$ and $I_T$, the motor torques $T_S$ and $T_T$ generated by each of the supply and take-up reel motors are set as follows:

$$T_S = \frac{d\omega_S}{dt} \cdot I_S + \gamma_S F_S$$

and $$T_T = \frac{d\omega_T}{dt} \cdot I_T + \gamma_T F_T$$

where $\omega_S$ and $\omega_T$ are the angular velocities of the supply and take-up reels.

In this manner, stable start/stop can be realized without damaging the magnetic tape or the like.

However, the above proposed construction involves the following problems. Namely, since tension sensors are required on the tape supply and take-up sides respectively in order to detect the moments of inertia, available mechanisms are restricted and the proposed construction cannot be employed in VTR's for citizens' use for which a small size is required. Also, since the motor torque for each reel changes depending on the output of the tension sensor, the control of the motor becomes unstable when a change occurs at a higher speed than the response speed of the tension sensor. Further, since the measurement of the moment of inertia of each reel is necessary upon acceleration and deceleration, the actual acceleration/deceleration operation has a time lag relative to a command. Furthermore, as the moments of inertia of both the reels and the motor torques are determined through an arithmetic process, the amount of operation required becomes large and hence a plurality of processors or an extremely expensive and high-speed processor must be used.

SUMMARY OF THE INVENTION

An object of the present invention for solving the above problems in the prior art is to provide a tape driving apparatus in which, upon start, a time required for bringing a tape speed upon a goal speed is very short. This can result in a shortened FF/REW time with the same tape speed, and a tape tension can be kept at a substantially constant value, which reduces tape damage. The above object of the invention can realize a rapid response to a command during deceleration or stopping of the tape, and a small deviation of an actual stop position from a desired stop position.

To attain the above object, a tape driving apparatus according to the present invention comprises driving means for driving a supply reel and a take-up reel, respectively, remaining tape radius detecting means for detecting information of the tape radius remaining on the supply reel, wound tape radius detecting means for detecting information of the tape radius wound on the take-up reel, take-up reel controlling means for producing take-up side torque information and for controlling the take-up reel, coefficient setting means for setting a determining coefficient of feed torque for the supply reel in accordance with the take-up side torque information and the tape radius information of the supply reel or the take-up reel, feed torque value determining means for determining feed torque information of the supply reel on the basis of the take-up side torque information, the information of the remaining tape radius on the supply reel, the information of the wound tape radius on the take-up reel and the determining coefficient of the feed torque, back torque value determining means for determining back torque information proportional to the information of the remaining tape radius on the supply reel, decision means for outputting a torque information change-over signal on the basis of a mode change-over command, the feed torque information and the back torque information, and change-over means for sending either one of the feed torque information and the back torque information to the supply reel driving means on the basis of the torque information change-over signal.

With the above construction, upon start, the feed torque value determining means determines the feed torque for the supply reel on the basis of the take-up side torque information, the information of the remaining tape radius on the supply reel and the information of the wound tape radius on the take-up reel so that a tape tension is always kept at a substantially constant value. Thereby, even in the case where a rapid start is made under the information of the maximum torque outputted by the take-up reel controlling means, the tape is not damaged and a load of the take-up reel is kept small.

Further, the above construction works well during deceleration or stopping of the tape. The feed torque value determining means determines a feed torque of the take-up reel on the basis of supply side torque information, the information of the tape remaining radius on the supply reel and the information of the wound tare radius on the take-up reel so that a tape tension is always kept at a substantially constant value. Thereby, even in the case where a rapid deceleration or stopping of the tape is performed under the information of the maximum torque outputted by the supply reel controlling means, the tape is not damaged and a load of the supply reel is kept small.

BRIEF DESCRIPTION OF THE DRAWINGS

FIGS. 2A, 2B and 2C show flow charts of a software, incorporated in a microcomputer, which is used in the first embodiment;

FIG. 3 is a timing chart showing a change in signal of each-part in the first embodiment;

FIGS. 8A, 8B, and 8C show flow charts of a software, incorporated in a microcomputer, which is used in the third embodiment;

FIG. 9 is a timing chart showing a change in signal of each part in the third embodiment;

FIG. 10 is a block diagram showing the construction of a tape driving apparatus according to a fourth embodiment of the present invention;

FIGS. 17A, 17B and 17C show flow charts of software, incorporated in a microcomputer, which is used in the sixth embodiment;

FIG. 22 is a graph showing the values of a loss torque in the reel motor in the embodiments of the present invention;

FIG. 23 is a graph showing the values of a coefficient relative to the tape radius on the reel to which a feed torque is to be outputted; and FIG. 24 is a graph showing the values of a tape tension relative to the tape radius on the reel to which a feed torque is to be outputted.

DESCRIPTION OF THE PREFERRED EMBODIMENTS

Embodiments of the present invention will now be explained referring the accompanying drawings.

Figure 1:
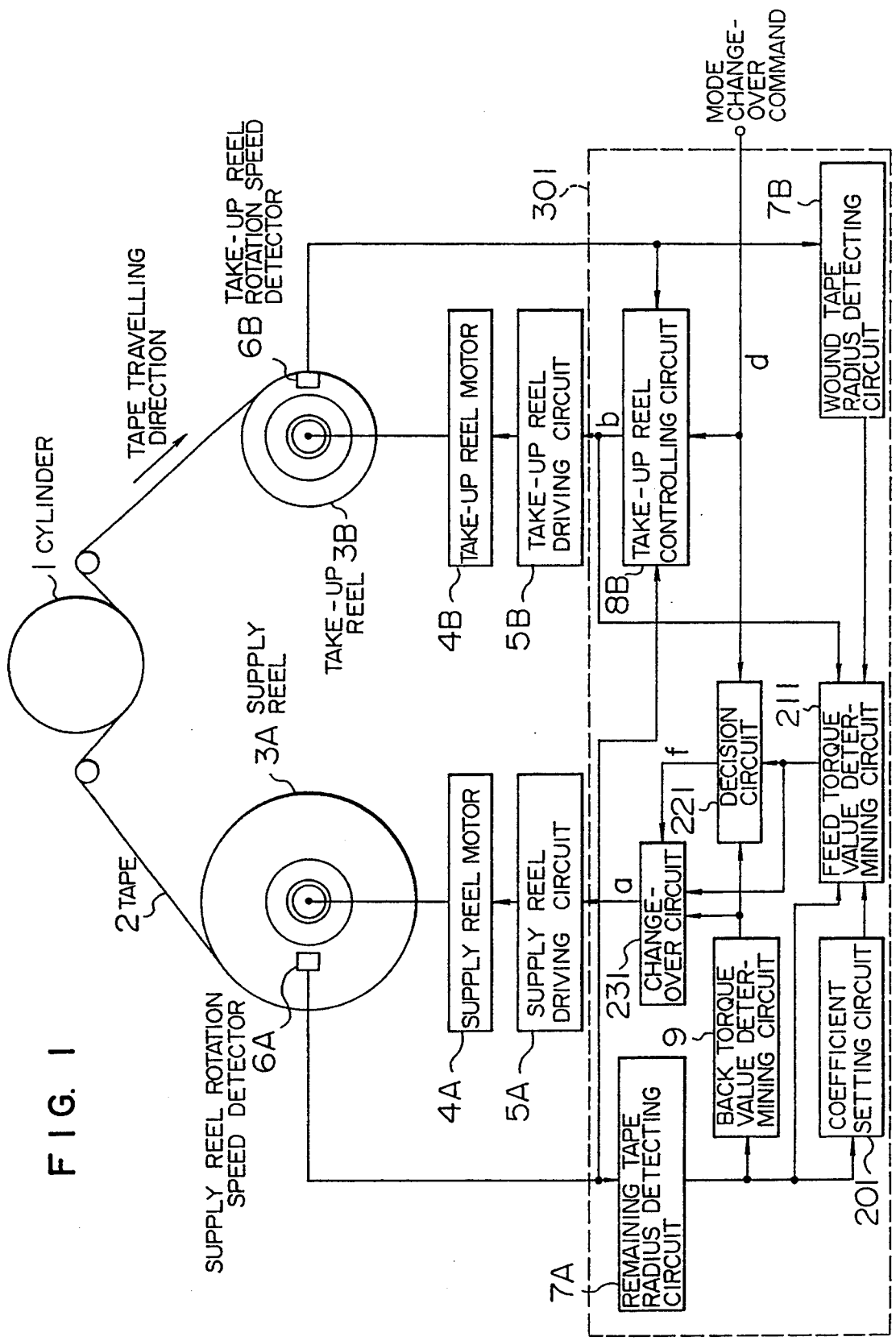
FIG. 1 is a block diagram showing the construction of a tape driving apparatus according to a first embodiment of the present invention.

FIG. 1 is a block diagram showing the construction of a tape driving apparatus according to a first embodiment of the present invention.

In FIG. 1, a tape 2 is unwound from a supply reel 3A and wound on a take-up reel 3B and is partially wound over a predetermined angle on a cylinder 1 disposed between the two reels. A supply reel motor 4A and a take-up reel motor 4B are driven by a supply reel driving circuit 5A and a take-up reel driving circuit 5B, respectively, to give rotation torques to the supply reel 3A and the take-up reel 3B. A take-up reel controlling circuit 8B outputs a take-up side torque value b to the take-up reel driving circuit 5B in accordance with mode change-over command d by use of pulses (FG) which are outputted from a supply reel rotation speed detector 6A and a take-up reel rotation speed detector 6B. A supply reel tape radius detecting circuit 7A detects the remaining tape radius on the supply reel 3A from the pulses (FG) outputted from the supply reel rotation speed detector 6A. A back torque value determining circuit 9 outputs a supply side torque value a proportional to information of the remaining tape radius on the supply reel outputted from the remaining tape radius detecting circuit 7A. A coefficient setting circuit 201 sets a coefficient in accordance with the information of the remaining tape radius on the supply reel outputted from the remaining tape radius detecting circuit 7A. A feed torque value determining circuit 211 determines a feed torque value for the supply reel 3A, on the basis of a relational equation which will be mentioned later on, from the coefficient set by the coefficient setting circuit 201, the information of the remaining tape radius on the supply reel outputted from the remaining tape radius detecting circuit 7A, the information of the wound tape radius on the take-up reel outputted from a wound tape radius detecting circuit 7B, and the take-up side torque value b outputted from the take-up reel controlling circuit 8B. A decision circuit 221 produces a torque change-over command f from the mode change-over command d, the feed torque value and a back torque value, and sends it to a change-over circuit 231. The change-over circuit 231 outputs the back torque value or the feed torque value to the supply reel driving circuit 5A in accordance with the torque change-over command f.

Next, the setting of the coefficient made by the coefficient setting circuit 201 and the determination of the feed torque value made by the feed torque value determining circuit 211 will be explained by use of graphs shown in FIGS. 23 and 24.

The tape radii of the reels, the moments of inertia of the reels, the tape tensions, the torques generated by the motors, the angular velocities of the reels and the angular accelerations of the reels are denoted as follows.

$\gamma_S$: the tape wind radius of the supply reel 3A,
$\gamma_T$: the tape wind radius of the take-up reel 3B,
$I_S$: the moment of inertia of the supply reel 3A,
$I_T$: the moment of inertia of the take-up reel 3B,
$F_S$: the tape tension in the side of the supply reel 3A
$F_T$: the tape tension in the side of the take-up reel 3B
$T_S$: the torque generated by the supply reel motor 4A,
$T_T$: the torque generated by the take-up reel motor 4B,
$\omega_S$: the angular velocity of the supply reel 3A,
$\omega_T$: the angular velocity of the take-up reel 3B,
$\dot{\omega}_S$: the angular acceleration of the supply reel 3A,
$\dot{\omega}_T$: the angular acceleration of the take-up reel 3B,
where each of $T_S$, $T_T$, $\omega_S$, $\omega_T$, $\dot{\omega}_S$ and $\dot{\omega}_T$ is assumed to take a positive value in a left-handed or tape take-up direction. The equation of motion of the supply reel represented by $$I_S \dot{\omega}_S = T_S - \gamma_S F_S \quad (1)$$

and the equation of motion of the take-up reel is represented by $$I_T \dot{\omega}_T = T_T - \gamma_T F_T \quad (2)$$

Further, the speed $V_T$ of the tape during travel is represented by $$V_T = \omega_T \gamma_T = -\omega_S \gamma_S$$

Differentiating this equation, we obtain $$\dot{\omega}_T \gamma_T = -\dot{\omega}_S \gamma_S \quad (3)$$

From equations (1), (2) and (3), a torque $T_S$ generated by the supply reel motor can be written as follows:

$$T_S = \frac{I_S \cdot \gamma_T}{I_T \cdot \gamma_S} (\gamma_T \cdot F_T - T_T) + \gamma_S \cdot F_S \quad (4)$$

On the other hand, a relationship between the tape tension $F_S$ of the supply reel 3A and the tape tension $F_T$ of the take-up reel 3B is determined depending on a tape travelling system and is represented by $$F_T = K \cdot F_S$$

where K is a constant of the tape travelling system. Introducing this relationship into equation (4), we obtain $$T_S = \frac{I_S \cdot \gamma_T}{I_T \cdot \gamma_S} (\gamma_T \cdot K \cdot F_S - T_T) + \gamma_S \cdot F_S \quad (5)$$

The content of the calculation made by the feed torque value determining circuit 211 is what is represented by equation (5).

When the coefficient $$\frac{I_S \cdot \gamma_T}{I_T \cdot \gamma_S} \quad (6)$$

included in equation (5) is calculated for the remaining tape radius on the supply reel 3A (on the feed torque generating side) in conjunction with the actual tape (VHS 120-minute video tape), there is obtained a graph as shown by dotted line in FIG. 23. In order to simplify the determination of the feed torque value, the graph shown by dotted line is approximated to that shown by a solid line in FIG. 23. A tape tension, when such an approximation is made, results in a solid line shown in FIG. 24. From FIG. 24, it is seen that the approximated tape tension falls within about ±25% as compared with a goal value shown by a dotted line. In summary, the setting of the coefficient made by the coefficient setting circuit 201 is the setting the value of equation (6) by use of the information of the remaining tape radius on the supply reel and is shown by the solid line of FIG. 23.

The operation of the tape driving apparatus of the present embodiment having the above construction will now be explained using flow charts shown in FIG. 2 and a timing chart shown in FIG. 3.

In the present embodiment, the whole of a portion 301 enclosed by a dotted line in FIG. 1 is realized in the form of a software running on a microcomputer. The flow charts shown in FIGS. 2A, 2B and 2C are those of the software incorporated in the microcomputer. The timing chart shown in FIG. 3 illustrates temporal changes of the supply side torque value a, the take-up side torque value b, the tape speed information, the mode change-over command d, the torque change-over command f, and the tape tension at that time.

A processing performed in the microcomputer includes processings A and B which are activated by FG signals respectively generated from the supply reel rotation speed detector 6A and take-up reel rotation speed detector 6B and a processing C which is always activated at a constant period.

Upon start of FF travel, the processing C shown in FIG. 2C receives a command of high-speed travel. Then, the sum of the squares of FG periods detected through the processings A and B is determined and a speed error against a goal speed is determined. Next, a back torque value is determined which is proportional to a remaining tape radius on the supply reel determined in the processing A. And, a coefficient of the solid line shown in FIG. 23 is set from the remaining tape radius on the supply reel. Thereafter, from the coefficient, the speed error and the tape radii determined in the processings A and B, a feed torque value according to equation (5) is determined with a tension ($F_S$) being set to a value slightly higher than that in the normal travel. The feed torque value is compared with the back torque value. In the case where the back torque is larger than the feed torque, the speed error is outputted through a D/A converter to the take-up reel driving circuit 5B while the feed torque is outputted through a D/A converter to the supply reel driving circuit 5A. On the other hand, in the case where the feed torque is larger than the back torque, the speed error is outputted through the D/A converter to the take-up reel driving circuit 5B while the back torque is outputted through the D/A converter to the supply reel driving circuit 5A.

As apparent from the operation explained above, upon start, a large take-up torque is generated at the take-up reel 3B and a feed torque is generated at the supply reel 3A, as shown in FIG. 3. Thereby, high-speed start can be realized with the tape 2 being kept at a stable condition having a tension value slightly higher than that in the normal travel. When the tape speed approaches a goal speed, a back torque is generated at the supply reel 3A, thereby making a stable tension control during the normal travel.

According to the present embodiment mentioned above, a control to cause no tape damage due to an abnormal tension upon issuance of a mode change-over command d for start can be made by providing the coefficient setting circuit 201 for setting a coefficient on the basis of information of the remaining tape radius on the supply reel, the feed torque value determining circuit 211 for determining a feed torque value based on the coefficient, information of the wound tape radius on the take-up reel, information of the remaining tape radius on the supply reel and take-up side torque information, the decision circuit 221 for outputting a torque change-over command f to the change-over circuit 231 in accordance with the mode change-over command and through comparison of a back torque value and the feed torque value, and the change-over circuit 231 for outputting the back torque value or the feed torque value to the supply reel driving circuit 5A in accordance with the torque change-over command f.

Also, a tape speed can be rapidly brought into a goal speed and hence an FF/REW time can be shortened with the same tape speed.

Further, an excellent performance can be realized through a very easy operation by step-wise making the setting of the coefficient by the coefficient setting circuit 201 for the information of the wound tape radius on the take-up reel.

Furthermore, in the present embodiment, all processings are performed by the software on a microcomputer, thereby attaining such advantages as circuit size reduction, weight reduction and space saving. If all the processings have been performed by software even hitherto, such advantages can be realized with no increase in cost, and hence the practical value of the present embodiment is very high.

Figure 4:
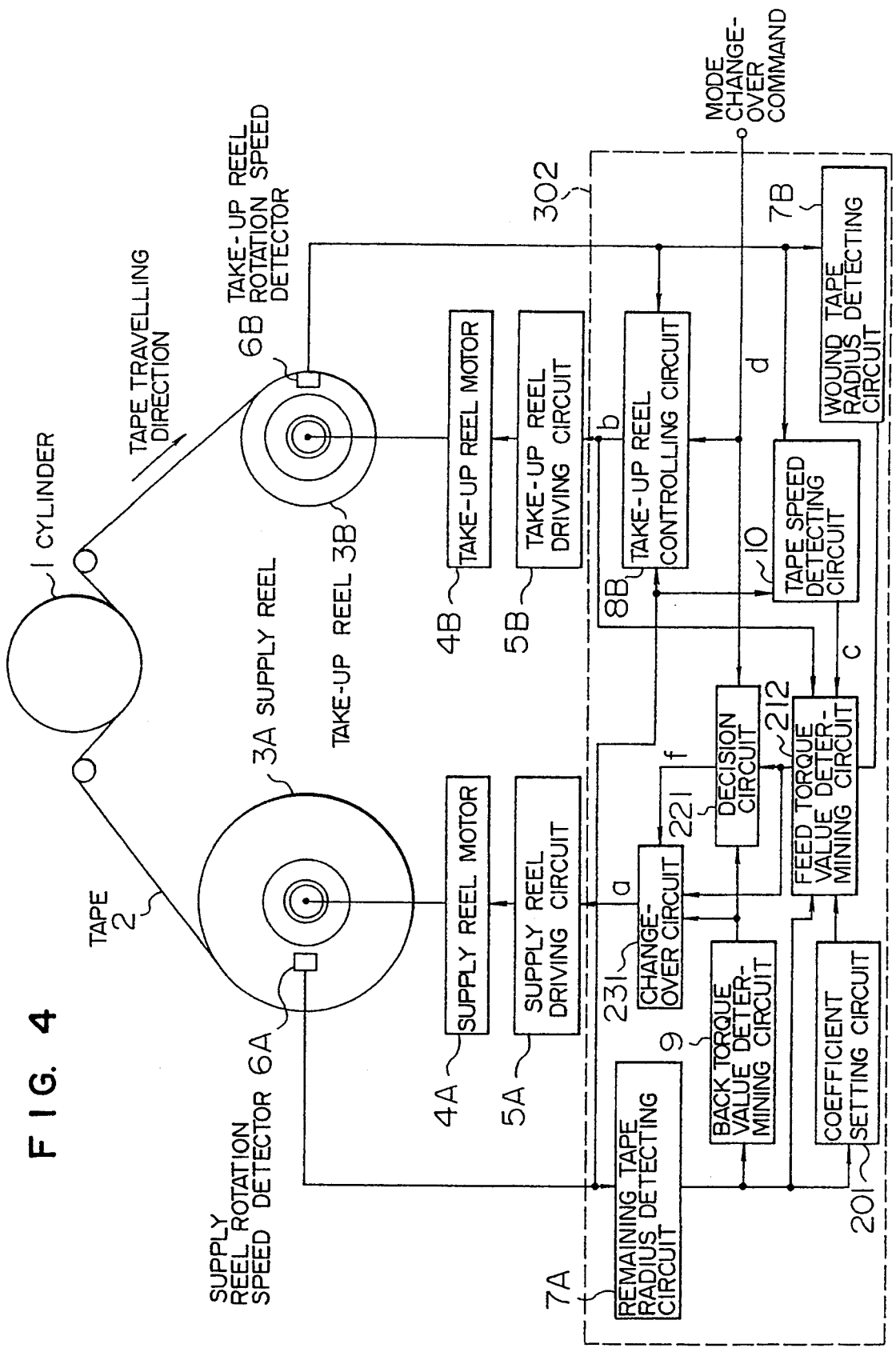
FIG. 4 is a block diagram showing the construction of a tape driving apparatus according to a second embodiment of the present invention.

FIG. 4 is a block diagram showing the construction of a tape driving apparatus according to a second embodiment of the present invention.

Explanation of the same components in FIG. 4 as those in FIG. 1 will be omitted. A tape speed detecting circuit 10 outputs tape speed information c at that time by use of pulses (FG) outputted from the supply reel rotation speed detector 6A and the take-up reel rotation speed detector 6B. A feed torque value determining circuit 212 determines a torque value from a coefficient outputted from the coefficient setting circuit 201, information of the remaining tape radius on the supply reel, information of the wound tape radius on the take-up reel and a take-up side torque value b in accordance with equation (5) explained in conjunction with the first embodiment and corrects the determined torque value in accordance with the tape speed information c outputted from the tape speed detecting circuit 10 and in a relation shown hereunder, thereby determining a feed torque value.

Now assume that a goal speed of the tape is $V_T$. In the case where the feed torque value in a feed direction corresponding to a negative value of the right-hand side of equation (5), the feed torque value is determined in a relation shown in Table 1. In the case where the feed torque value is in a take-up direction, the value of equation (5) is determined as the feed torque value as it is.

TABLE 1

| TAPE SPEED | FEED TORQUE VALUE |
|---|---|
| $0-V_T/2$ | VALUE OF EQUATION (5) |
| $V_T/2-3\ V_T/4$ | VALUE OF EQUATION (5) × ½ |
| $3\ V_T/4-7\ V_T/8$ | VALUE OF EQUATION (5) × ¼ |
| $7\ V_T/8-$ | 0 |

Figure 5A:
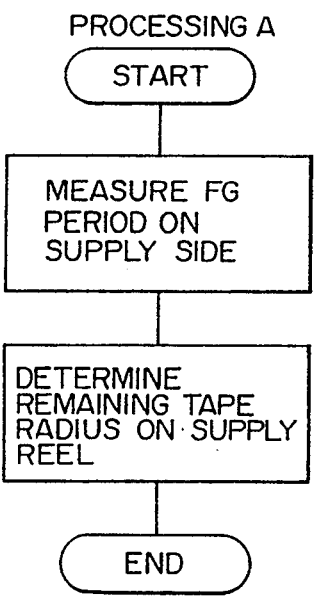
FIGS. 5A, 5B and 5C show flow charts of a software, incorporated in a microcomputer, which is used in the second embodiment.
Figure 5B:
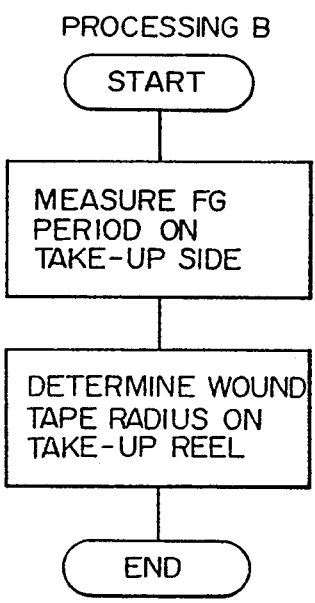

The operation of the tape driving apparatus of the present embodiment having the above construction will now be explained using flow charts shown in FIGS. 5A, 5B and 5C and a timing chart shown in FIG. 6.

In the present embodiment, the whole of a portion 302 enclosed by a dotted line in FIG. 4 is realized in the form of a software running on a microcomputer. The flow charts shown in FIGS. 5A, 5B and 5C are those of the software incorporated in the microcomputer. The timing chart shown in FIG. 6 illustrates temporal changes of the supply side torque value a, the take-up side torque value b, the tape speed information c, the mode change-over command d, the torque change-over command f, and the tape tension at that time.

A processing performed on the microcomputer includes processings A and B which are activated by FG signals respectively generated from the supply reel rotation speed detector 6A and the take-up reel rotation speed detector 6B and a processing C which is always activated at a constant period.

Figure 5C:
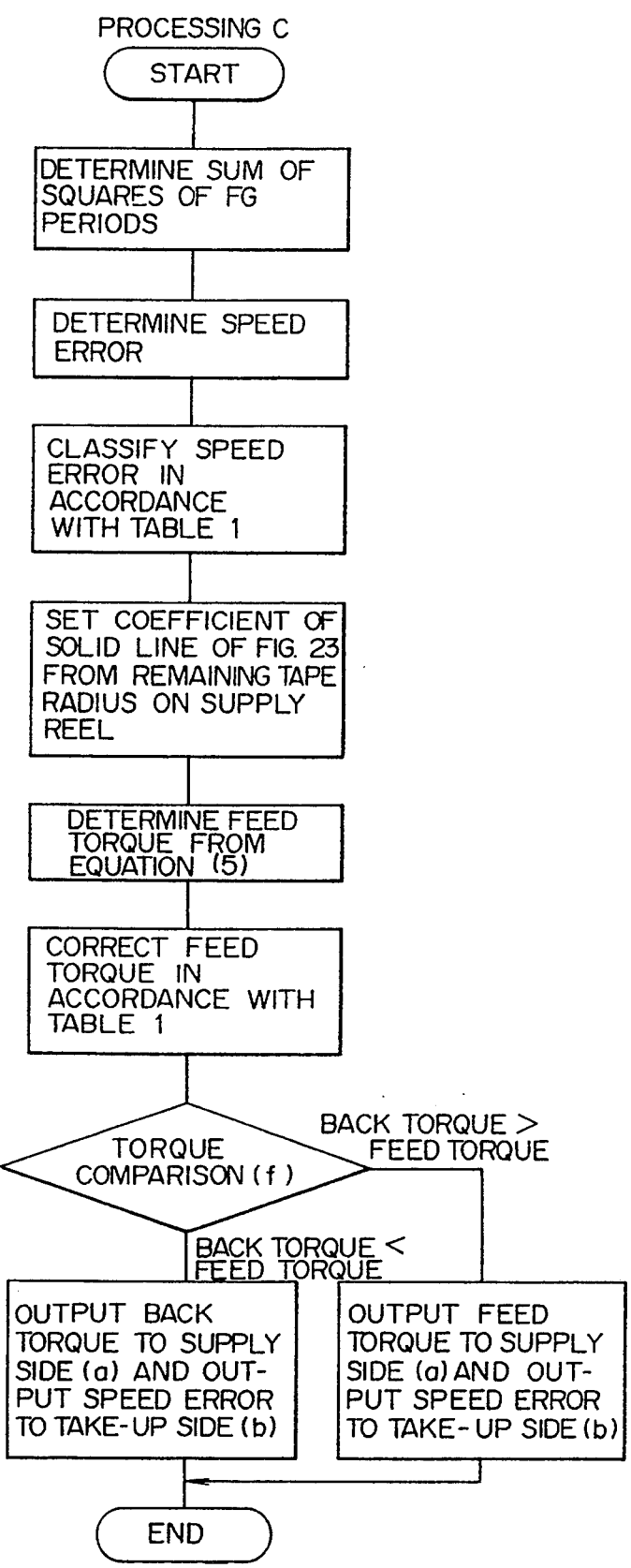

A basic operation at the time of start of FF travel is similar to that in the first embodiment but the processing C shown in FIG. 5C includes classifying a tape speed at that time into four ranges based on the value of a speed error and a feed torque value determined from equation (5) is corrected in accordance with Table 1.

Figure 6:
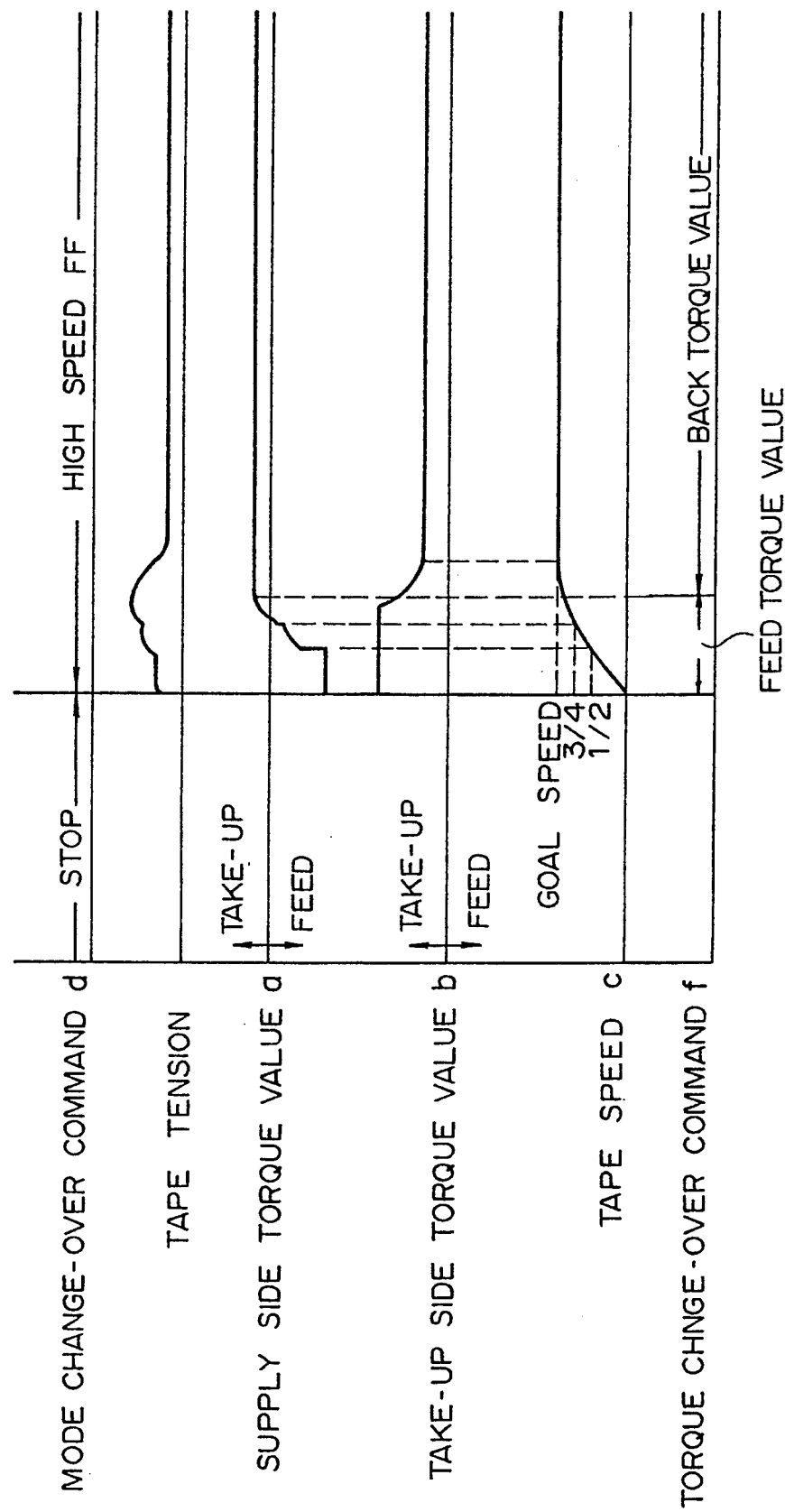
FIG. 6 is a timing chart showing a change in signal of each part in the second embodiment.

Thus, as shown in FIG. 6, a feed torque value of the supply side torque value a becomes small as the tape speed becomes high. When the feed torque value takes a torque value in a take-up direction, the feed torque value is outputted as it is. By thus controlling the feed torque value, a tape tension upon start becomes gradually high from a point of time when the tape speed reaches one half of the goal speed. When the tape speed approaches the goal speed, a back torque is applied to the supply reel, thereby making a stable tension control during the normal travel.

According to the present embodiment mentioned above, a control to cause no tape damage due to an abnormal tension upon issuance of a mode change-over command d for start can be made by providing the tape speed detecting circuit 10 for outputting tape speed information c, the coefficient setting circuit 201 for setting a coefficient based on information of a remaining tape radius on the supply reel, the feed torque value determining circuit 212 for determining a feed torque value based on the coefficient, the information of the wound tape radius on the take-up reel, the information of the remaining radius on the supply reel, take-up side torque value b and the tape speed information c, the decision circuit 221 for outputting a torque change-over command f in accordance with the mode change-over command d and through comparison of a back torque value and the feed torque value, and the change-over circuit 231 for outputting the back torque value or the feed torque value to the supply reel driving circuit 5A in accordance with the torque change-over command f.

Also, a tape speed can be rapidly brought into a goal speed and hence an FF/REW time can be shortened with the same tape speed.

Further, since a tape tension, when the tape speed reaches the goal speed, is set to a high value, the slack of the tape can be prevented from occuring at the time of the actual tape travel due to the lowering of the tension caused by a difference in loss torque between motors in the case where a difference in the tape radii between the supply and take-up reels is large.

Furthermore, an excellent performance can be realized through a very easy operation by step-wise making the setting of the coefficient by the coefficient setting circuit 201 according to the information of the wound tape radius on the take-up reel.

In addition, in the present embodiment, all processings are performed by the software on a microcomputer, thereby attaining such advantages as circuit size reduction, weight reduction and space saving. If all the processings have been performed by software even hitherto, such advantages can be realized with no increase in cost and hence the practical value of the present embodiment is very high.

Figure 7:
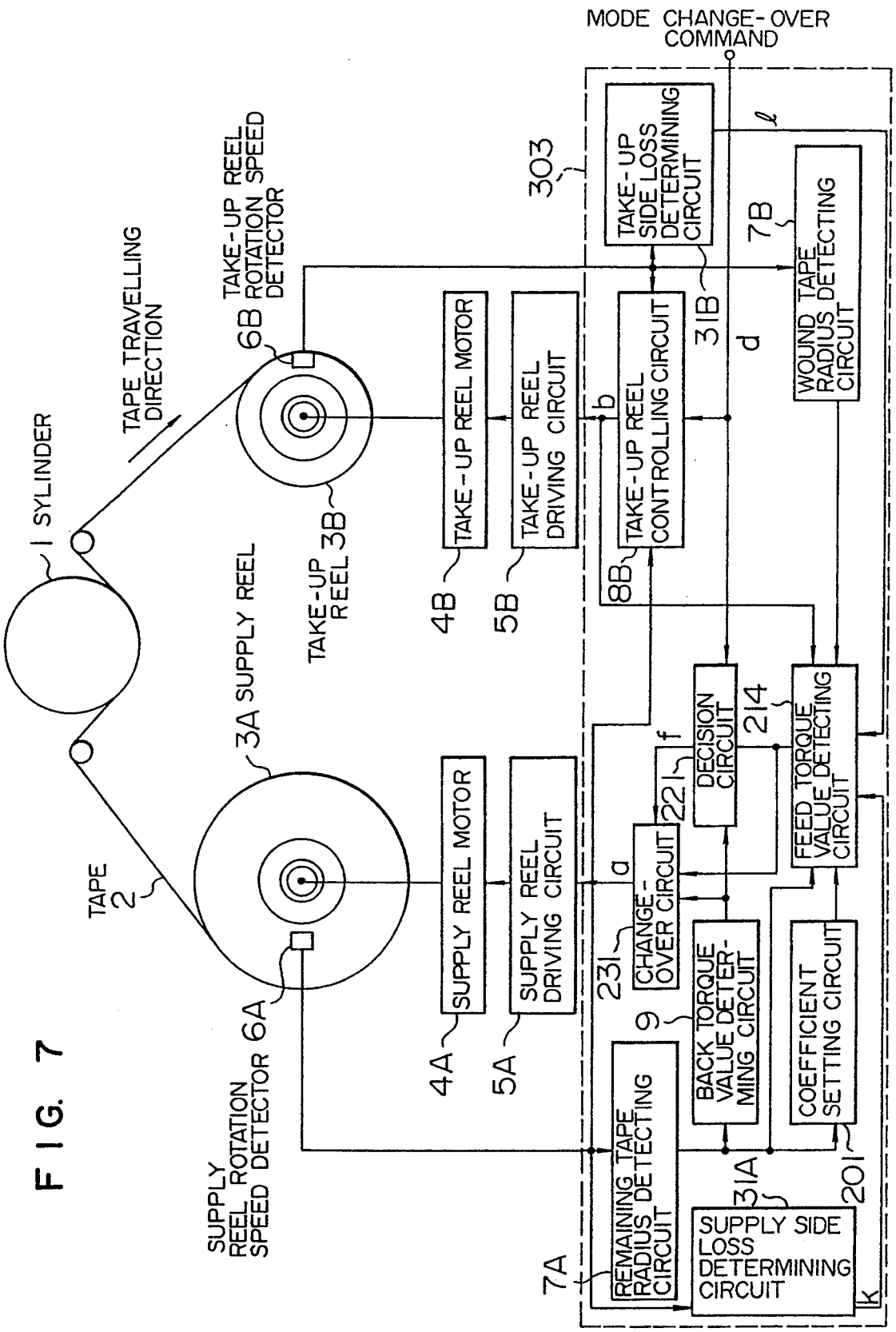
FIG. 7 is a block diagram showing the construction of a tape driving apparatus according to a third embodiment of the present invention.

FIG. 7 is a block diagram showing the construction of a tape driving apparatus according to a third embodiment of the present invention.

Explanation of the same components in FIG. 7 as those in FIG. 1 will be omitted. A supply side loss determining circuit 31A and a take-up side loss determining circuit 31B receive supply reel rotation speed information and take-up reel rotation speed information outputted from the supply reel rotation speed detector 6A and the take-up reel rotation speed detector 6B, respectively, to determine a supply side loss k and a take-up side loss l in accordance with a solid line in a graph shown in FIG. 22. A feed torque value determining circuit 214 determines a feed torque value of the supply reel, in accordance with a relational equation shown hereinunder, based on the coefficient, information of a remaining tape radius on the supply reel outputted from a remaining tape radius detecting circuit 7A, information of a wound tape radius on the take-up reel outputted from a wound tape radius detecting circuit 7B, the supply side loss information k, the take-up side loss l, and a take-up side torque value b outputted from the take-up reel controlling circuit 8B.

FIG. 22 is a graph showing the values of a loss torque of the reel motor. The abscissa represents the rotation speed of the reel motor. A dotted line shown in FIG. 22 is the actual loss torque value. But, the loss determining circuits 31A and 31B determine the loss information k and l by approximating the curve shown by the dotted line to a linear function shown by a solid line.

Next, explanation will be made of the determination of the feed torque value produced by the feed torque value determining circuit 214.

The loss torques of the reel motors are denoted as follows:

$f_T(\omega_T)$: the loss torque of the take-up reel motor,
$f_S(\omega_S)$: the loss torque of the supply reel motor, where each of $f_S(\omega_S)$ and $f_T(\omega_T)$ is assumed to take a positive value in a feed direction.

When introducing the loss torques of the reel motors into equations (1) and (2) shown in conjunction with the first embodiment, the equation of motion of the supply reel is represented by $$I_S \dot{\omega}_S = T_S - \text{hd } \gamma S \cdot F_S - f_S(\omega_S) \qquad (10)$$

and the equation of motion of the take-up reel is represented by $$I_T \dot{\omega}_T = T_T - \gamma_T F_T - f_T(\omega_T) \qquad (11)$$

Determining a torque generated by the supply reel motor by use of equations (10) and (11) in a manner similar to that in the first embodiment, we obtain $$T_S = \frac{I_S \cdot \gamma_T}{I_T \cdot \gamma_S} (\gamma_T \cdot K \cdot F_S + f_T(\omega_T) - T_T) + \gamma_S \cdot F_S + f_S(\omega_S) \qquad (12)$$

The content of the calculation made by the feed torque value determining circuit 214 is what is represented by equation (12).

The operation of the tape driving apparatus of the present embodiment having the above construction will now be explained using flow charts shown in FIGS. 8A, 8B and 8C and a timing chart shown in FIG. 9.

In the present embodiment, the whole of a portion 303 enclosed by a dotted line in FIG. 7 is realized in the form of software running on a microcomputer. The flow charts shown in FIGS. 8A, 8B and 8C are those of the software incorporated in the microcomputer. The timing chart shown in FIG. 9 illustrates temporal changes of the supply side torque value a, the take-up side torque value b, the tape speed information, the mode change-over command d, the torque change-over command f, and the tape tension at that time.

A processing performed on the microcomputer includes processings A and B which are activated by FG signals respectively generated based on the supply reel rotation speed detector 6A and the take-up reel rotation speed detector 6B and a processing C which is always activated at a constant period.

A basic operation at the time of start of FF travel is similar to that in the first embodiment but each of the processings A and B shown in FIGS. 8A and 8B additionally includes determining a loss torque conformable to the rotation speed of the reel motor at that time by use of the FG period detected and the processing C additionally includes determining a feed torque from equation (12) by use of the loss torques determined in the processings A and B.

Thus, in the case where a tape radius on the feed torque generating side is large, a feed torque value of the supply side torque value a becomes gradually small as a tape speed becomes high, as shown in FIG. 9. Thereby, a rapid start is made with a stable tape tension being always kept irrespective of the tape speed.

According to the present embodiment mentioned above, a control to cause no tape damage due to an abnormal tension upon issuance of a mode change-over command d for start can be made by providing the remaining tape radius detecting circuit 7A for determining information of the remaining tape radius on the supply reel, the wound tape radius detecting circuit 7B for determining the information of the wound tape radius on the take-up reel, the supply side loss determining circuit 31A for determining supply side loss information k, the take-up side loss determining circuit 31B for determining take-up side loss information l, the coefficient setting circuit 201 for setting a coefficient based on information of a remaining tape radius on the supply reel, the feed torque value determining circuit 214 for determining a feed torque value based on the coefficient, the information of the wound tape radius on the take-up reel, the information of the remaining tape radius on the supply reel the supply side loss information k, the take-up side loss information l and take-up side torque information, the decision circuit 221 for outputting a torque change-over command f in accordance with the mode change-over command d and through comparison of a back torque value and the feed torque value, and the change-over circuit 231 for outputting the back torque value or the feed torque value to the supply reel driving circuit 5A in accordance with the torque change-over command f. Also, a tape speed can be rapidly brought into a goal speed and hence an FF/REW time can be shortened with the same tape speed.

Further, the feed torque value determining circuit 214 uses the supply side loss information k and the take-up side loss information l for determination of the feed torque value. Therefore, even in the case where a difference in tape radii between supply reel 3A and the take-up reel 3B is large, a tape tension can be kept at a constant value even in a transition state with no occurrence of the slack of the tape, thereby making it possible to realize a stable start operation.

Furthermore, an excellent performance can be realized through a very easy operation by determining the loss information k and l by the loss determining circuits 31A and 31B from a linear function of the rotation speed information of each reel and step-wise setting of the coefficient by the coefficient setting circuit 201 based on the information of the remaining radius on the supply reel.

In addition, in the present embodiment, all processings are performed by the software on a microcomputer, thereby attaining such advantages as circuit size reduction, weight reduction and space saving. If all the processings have been performed by software even hitherto, such advantages can be realized with no increase in cost and hence the practical value of the present embodiment is very high.

FIG. 10 is a block diagram showing the construction of a tape driving apparatus according to a fourth embodiment of the present invention.

Explanation of the same components in FIG. 10 as those in FIG. 4 will be omitted. In FIG. 10, a coefficient setting circuit 202 sets a coefficient in accordance with the information of a wound tape radius on the take-up reel outputted from a wound tape radius detecting circuit 7b. A feed torque value determining circuit 213 determines a feed torque value, in accordance with a relational equation shown hereinunder, based on the coefficient, information of a remaining tape radius on the supply reel, information of a wound tape radius on the take-up reel, and a supply side torque value a outputted from a supply side change-over circuit 232. A constant-speed travel take-up reel controlling circuit 8C receives pulses (FG) outputted from the supply reel rotation speed detector 6A and the take-up reel rotation speed detector 6B to output a take-up control torque value for controlling a tape speed to a constant value in accordance with a command from a decision circuit 222. A deceleration torque value determining circuit 24 receives the pulses (FG) outputted from the supply reel rotation speed detector 6A and the take-up reel rotation speed detector 6B to output a deceleration torque value for decelerating the tape speed in accordance with a command from the decision circuit 222. The decision circuit 222 produces change-over commands g and h from a mode change-over command d, the feed torque value, the take-up control torque value, a back torque value and the deceleration torque value to send them to the supply side change-over circuit 232 and a take-up side change-over circuit 233, respectively. The supply side change-over circuit 232 outputs the back torque value and the deceleration torque value to the supply reel driving circuit 5A in accordance with the supply side torque change-over command g. The take-up side change-over circuit 233 outputs the take-up control torque value or the feed torque value to the take-up reel driving circuit 5B in accordance with the take-up side torque change-over command h.

Next, explanation will made of the setting of the coefficient made by the coefficient setting circuit 202 and the determination of the feed torque made by the feed torque value determining circuit 213.

Interchanging the supply side and the take-up side in equation (5) explained in conjunction with the first embodiment, we obtain $$T_T = \frac{I_T \cdot \gamma_S}{I_S \cdot \gamma_T}(\gamma_S \cdot F_S - T_S) + \gamma_T \cdot K \cdot F_S. \tag{7}$$

A coefficient $$\frac{I_T \cdot \gamma_S}{I_S \cdot \gamma_T} \tag{8}$$

included in equation (7) is a reciprocal of the coefficient represented by equation (6) shown in conjunction with the first embodiment. However, since the side to which the feed torque is to be outputted is changed from the supply side to the take-up side, the graph of the coefficient shown in FIG. 23 with the feed side tape radius being taken along the abscissa can be used as it is. Also, the graph of the tape tension shown in FIG. 24 can be used as it is.

Figure 11A:
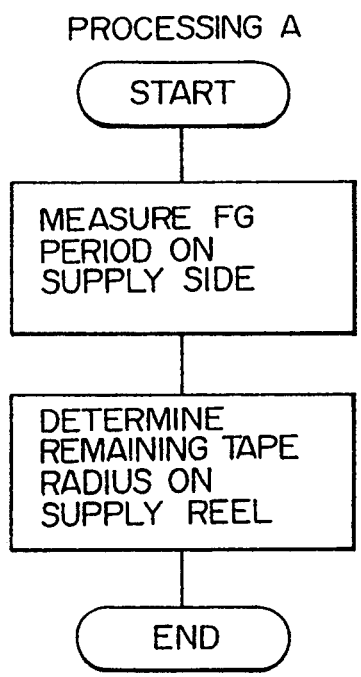
FIGS. 11A, 11B and 11C show flow charts of a software, incorporated in a microcomputer, which is used in the fourth embodiment.
Figure 11B:
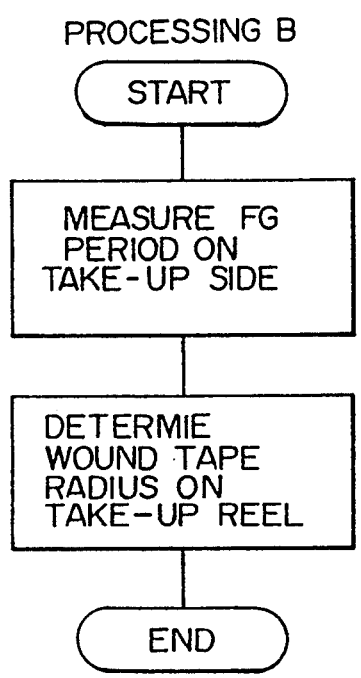

The operation of the tape driving apparatus of the present embodiment having the above construction will now be explained using flow charts shown in FIGS. 11A, 11B and 11C and a timing chart shown in FIG. 12.

In the present embodiment, the whole of a portion 304 enclosed by a dotted line in FIG. 10 is realized in the form of software running on a microcomputer. The flow charts shown in FIGS. 11A, 11B and 11C are those of the software incorporated in the microcomputer. The timing chart shown in FIG. 12 illustrates temporal changes of the supply side torque value a, the take-up side torque value b, the tape speed information, the mode change-over command d, the torque change-over commands g and h, and the tape tension at that time.

A processing performed on the microcomputer includes processings A and B which are activated by FG signals respectively generated from the supply reel rotation speed detector 6A and the take-up reel rotation speed detector 6B and a processing C which is always activated at a constant period.

Figure 11C:
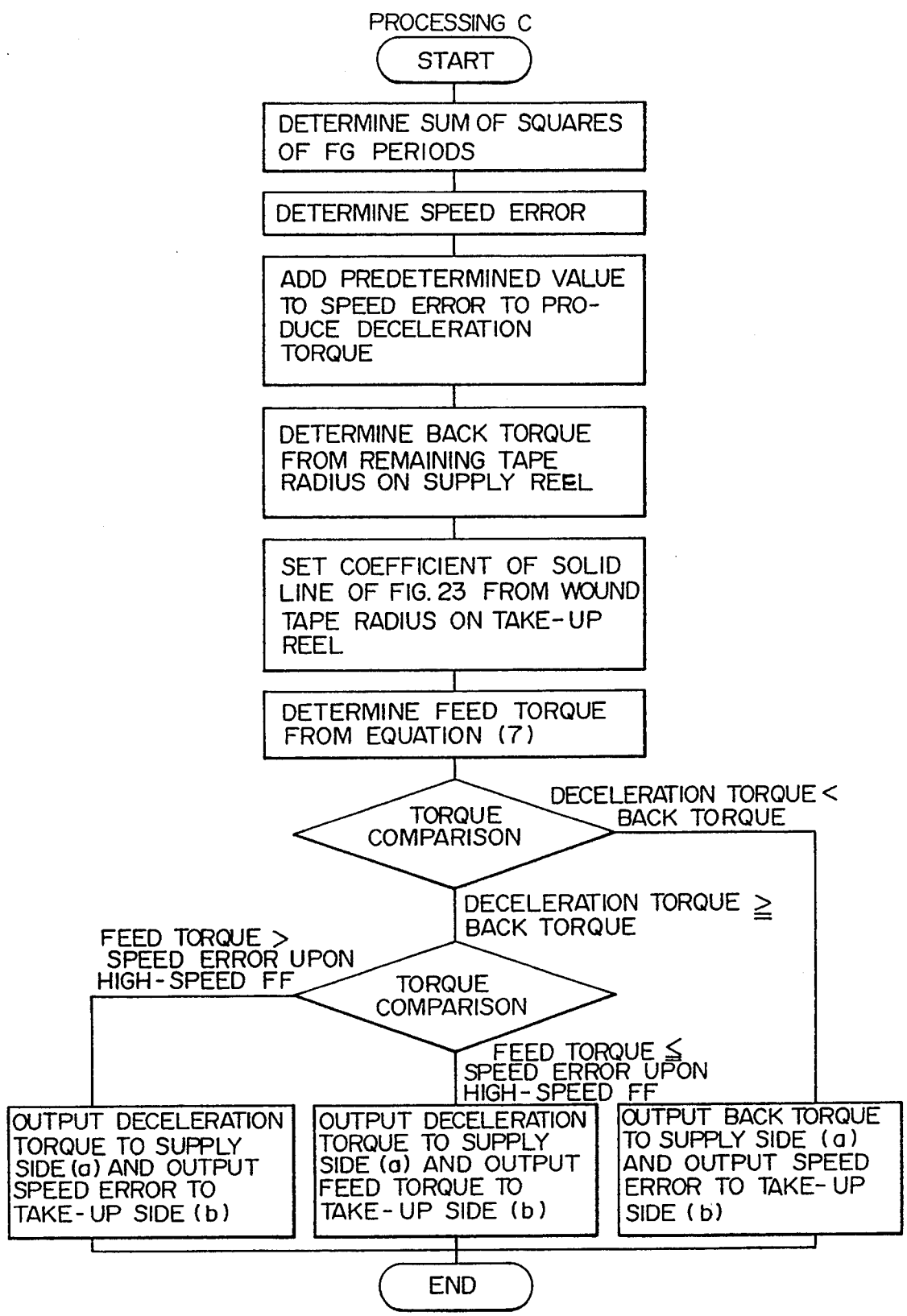

At the time of deceleration from a high-speed FF travel to a low-speed FF travel, the processing C shown in FIG. 11C includes changing a goal speed to a low value and determining a speed error to the low goal speed. And, a deceleration torque value is produced by inverting the sign of the speed error and adding a predetermined value to the inverted speed error. Next, a back torque value and a coefficient are determined from the supply reel tape radius. Then, from the co-efficient, the deceleration torque and the tape radii on the supply and take-up reels determined in the processings A and B, a feed torque is determined in accordance with equation (7) with a tension (Fs) being set to a value slightly higher than that in the normal travel. The back torque and the deceleration torque are compared. In the case where the deceleration torque is larger than the back torque, the speed error during the high-speed FF travel, which corresponds to the take-up side torque, and the feed torque are compared. When the feed torque is larger than the speed error during the high-speed FF travel, the speed error is outputted through a D/A converter to the take-up reel driving circuit 5B while the deceleration torque is outputted through a D/A converter to the supply reel driving circuit 5A. When the speed error during the high-speed FF travel is larger than the feed torque, the feed torque is outputted through the D/A converter to the take-up reel driving circuit 5B while the deceleration torque is outputted through the D/A converter to the supply reel driving circuit 5A. On the other hand in the case where the back torque is larger than the deceleration torque, the speed error is outputted through the D/A converter to the take-up reel driving circuit 5B while the back torque is outputted through the D/A converter to the supply reel driving circuit 5A.

Figure 12:
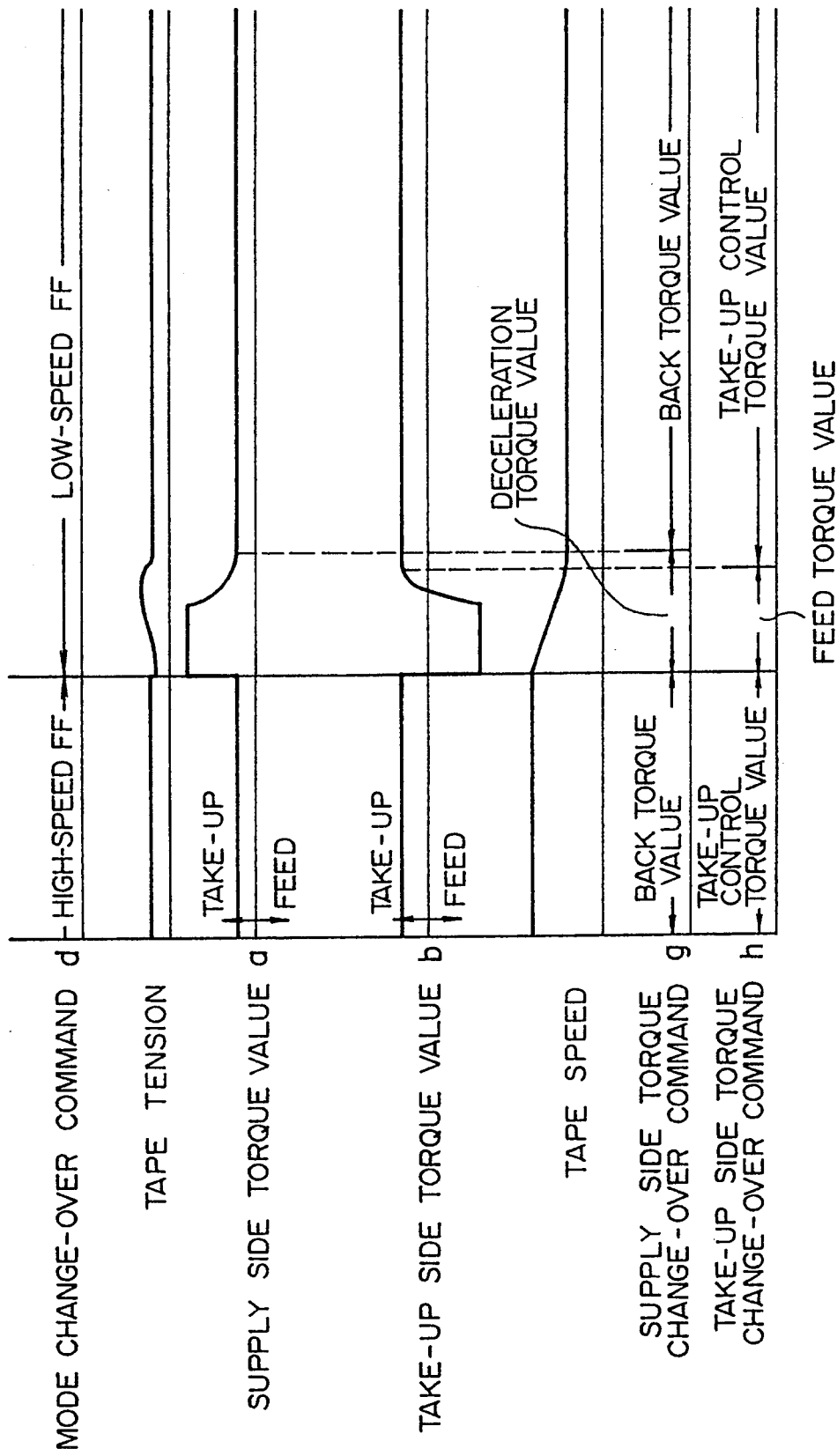
FIG. 12 is a timing chart showing a change in signal of each part in the fourth embodiment.

Thus, during the deceleration, a large deceleration torque is applied to the supply reel and a feed torque is applied to the take-up reel, as shown in FIG. 12. Thereby, a rapid deceleration can be realized with the tape 2 being kept at a stable condition having a tension value slightly higher than that during the normal travel. When the tape speed approaches a goal speed, a back torque is applied to the supply reel, thereby making a stable tension control under the normal travel.

According to the present embodiment mentioned above, there are provided the coefficient setting circuit 202 for setting a coefficient from information of a wound tape radius on the take-up reel, the feed torque value determining circuit 213 for determining a feed torque value based on the coefficient, the information of the wound tape radius on the take-up reel, information of a remaining tape radius on the supply reel and a supply side torque value a, a decision circuit 222 for outputting a supply side torque change-over command g through comparison of a back torque value and a deceleration torque value and a take-up side torque change-over command h through comparison of a take-up torque value and the feed torque value in accordance with a mode change-over command d, the supply side change-over circuit 232 for outputting the back torque value or the deceleration torque value to the supply reel driving circuit 5A in accordance with the supply side torque change-over command g, and the take-up side change-over circuit 233 for outputting a take-up control torque value or the feed torque value to the take-up reel driving circuit 5B in accordance with the take-up side torque change-over command h, whereby a tape speed can be rapidly decelerated to a goal speed without causing tape damage due to an abnormal tension upon issuance of the mode change-over command d for deceleration, thereby making it possible to improve remarkably the response speed.

Also, an excellent performance can be realized through a very easy operation by step-wise setting of the coefficient by the coefficient setting circuit 202 by use of the information of the wound tape radius on the take-up reel.

Further, in the present embodiment, all the processings are performed by the software on a microcomputer, thereby attaining such advantages as circuit size reduction, weight reduction and space saving. If all the processings have been performed by software even hitherto, such advantages can be realized with no increase in cost and hence the practical value of the present embodiment is very high.

Figure 13:
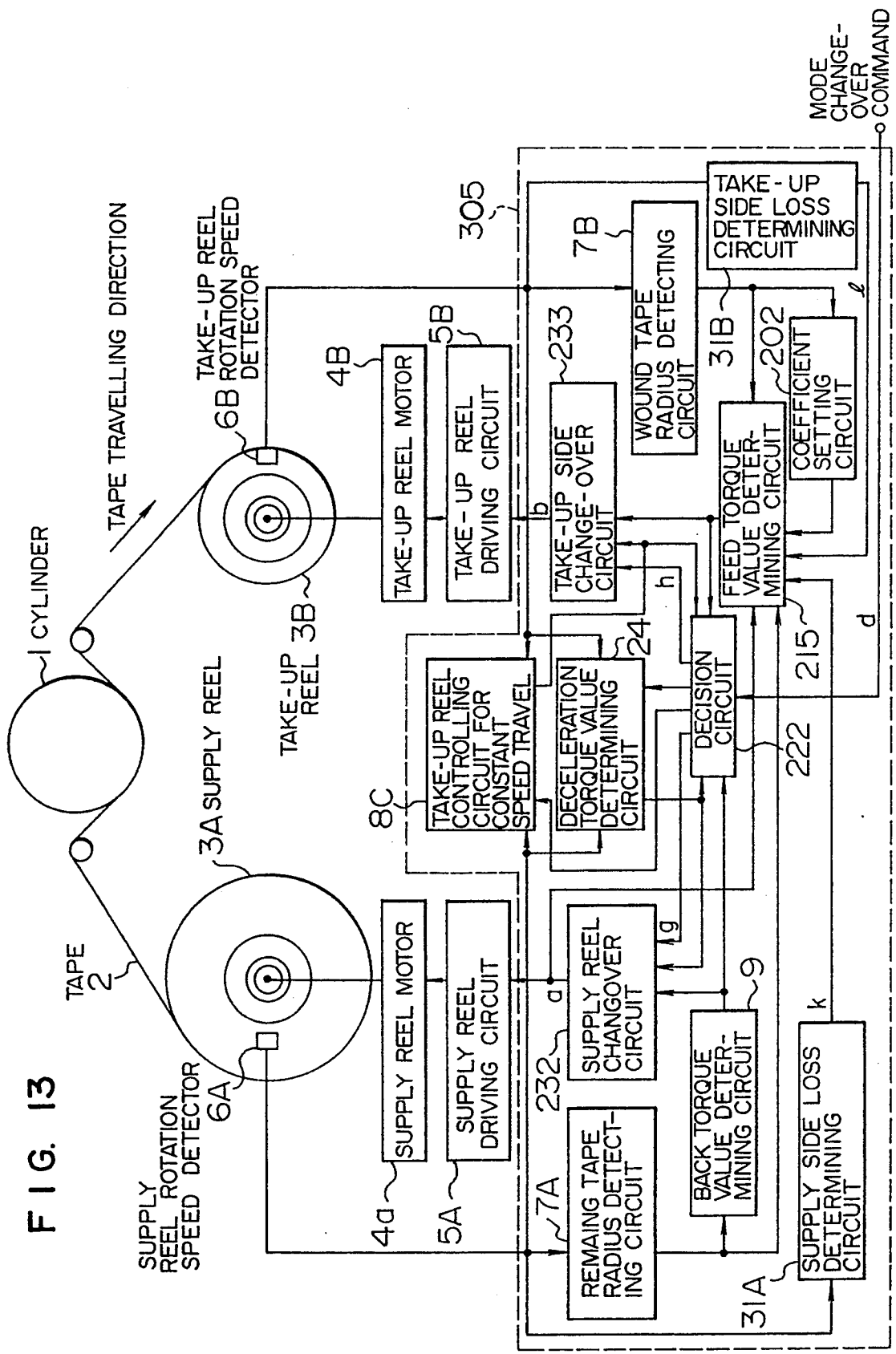
FIG. 13 is a block diagram showing the construction of a tape driving apparatus according to a fifth embodiment of the present invention.

FIG. 13 is a block diagram showing the construction of a tape driving apparatus according to a fifth embodiment of the present invention.

Explanation of the same components in FIG. 13 as those in FIGS. 10 and 7 will be omitted. In FIG. 13, a feed torque value determining circuit 215 determines a feed torque value, in accordance with a relational equation shown hereinunder, from a coefficient set by the coefficient setting circuit 202, information of a remaining tape radius on the supply reel, information of a wound tape radius on the take-up reel, supply side loss information k outputted from the supply side loss determining circuit 31A, take-up side loss information l outputted from the take-up side loss determining circuit 31B, and a supply side torque value a outputted from the supply side change-over circuit 232.

Next, explanation will be made of the setting of the coefficient made by the coefficient setting circuit 202 and the determination of the feed torque value made by the feed torque value determining circuit 215.

Interchanging the supply side and the take-up side in equation (12) explained in conjunction with the third embodiment, we obtain $$T_T = \frac{I_T \cdot \gamma_S}{I_S \cdot \gamma_T} (\gamma_S \cdot F_S + f_S(\omega_S) - T_S) + \gamma_T \cdot K \cdot F_S + f_T(\omega_T) \tag{13}$$

The operation of the tape driving apparatus of the present embodiment having the above construction will now be explained using flow charts shown in FIGS. 14A, 14B and 14C and a timing chart shown in FIG. 15.

In the present embodiment, the whole of a portion 305 enclosed by a dotted line in FIG. 13 is realized in the form of a software running on a microcomputer. The flow charts shown in FIGS. 14A, 14B and 14C are those of the software incorporated in the microcomputer. The timing chart shown in FIG. 15 illustrates temporal changes of the supply side torque value a, the take-up side torque value b, the tape speed information, the mode change-over command d, the torque change-over command g and h, and the tape tension at that time.

A processing performed on the microcomputer includes processings A and B which are activated by FG signals respectively generated from the supply reel rotation speed detector 6A and the take-up reel rotation speed detector 6B and a processing C which is always activated at a constant speed.

Figure 14A:
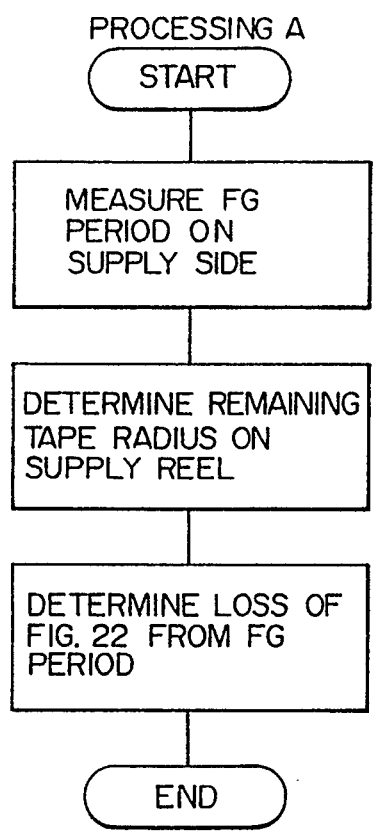
FIGS. 14A, 14B and 14C show flow charts of a software, incorporated in a microcomputer, which is used in the fifth embodiment.
Figure 14B:
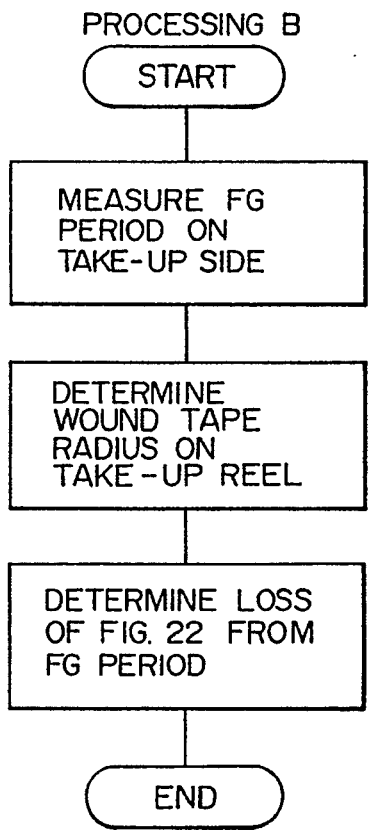
Figure 14C:
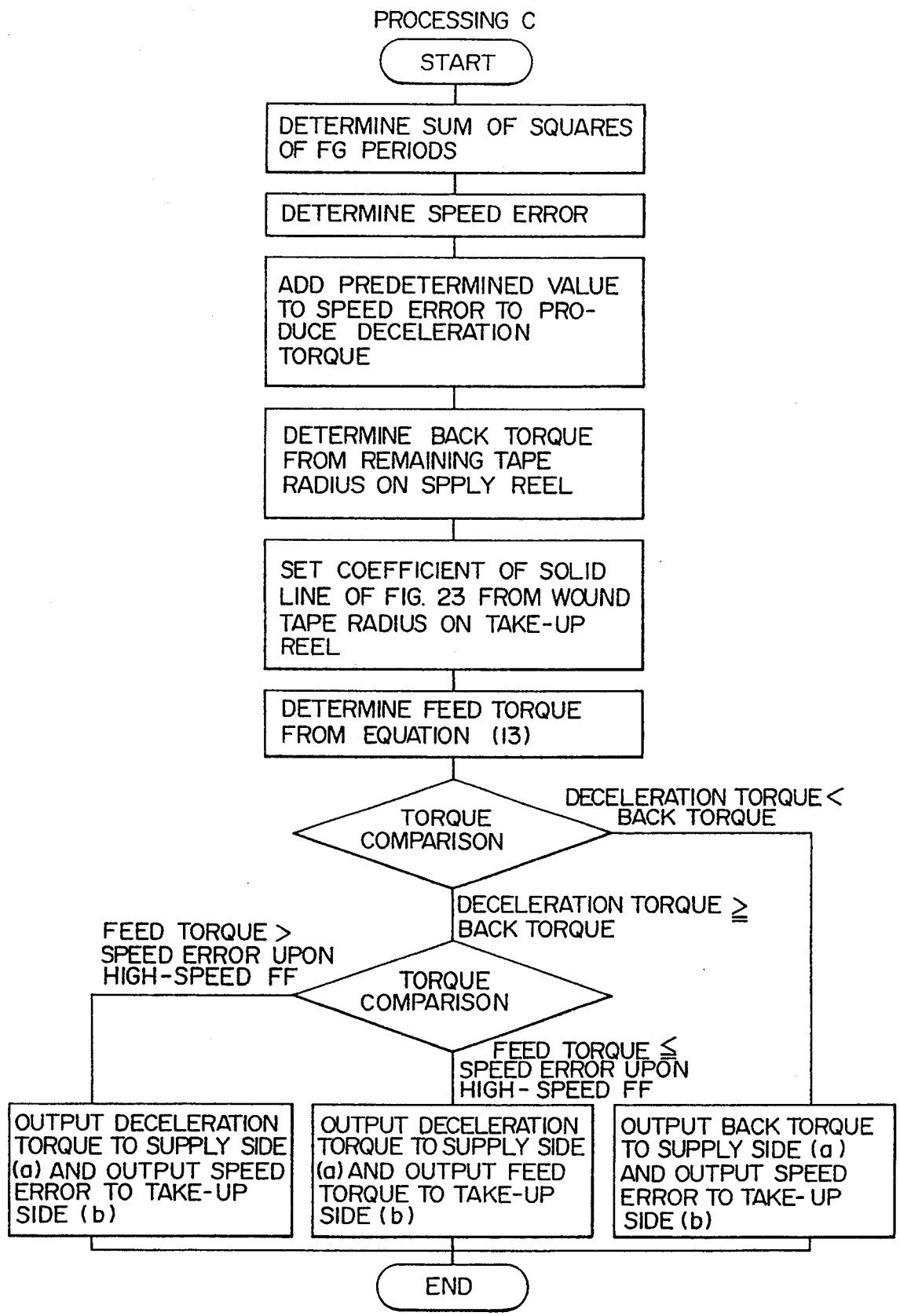

A basic operation during the deceleration from a high-speed FF travel to a low-speed FF travel is similar to that in the fourth embodiment but each of the processings A and B shown in FIGS. 14A and 14B additionally includes determining a loss torque conformable to the rotation speed of the reel motor at that time by the FG period detected, and the processing C additionally includes determining a feed torque from equation (13) by use of the loss torque determined in the processings A and B.

Figure 15:
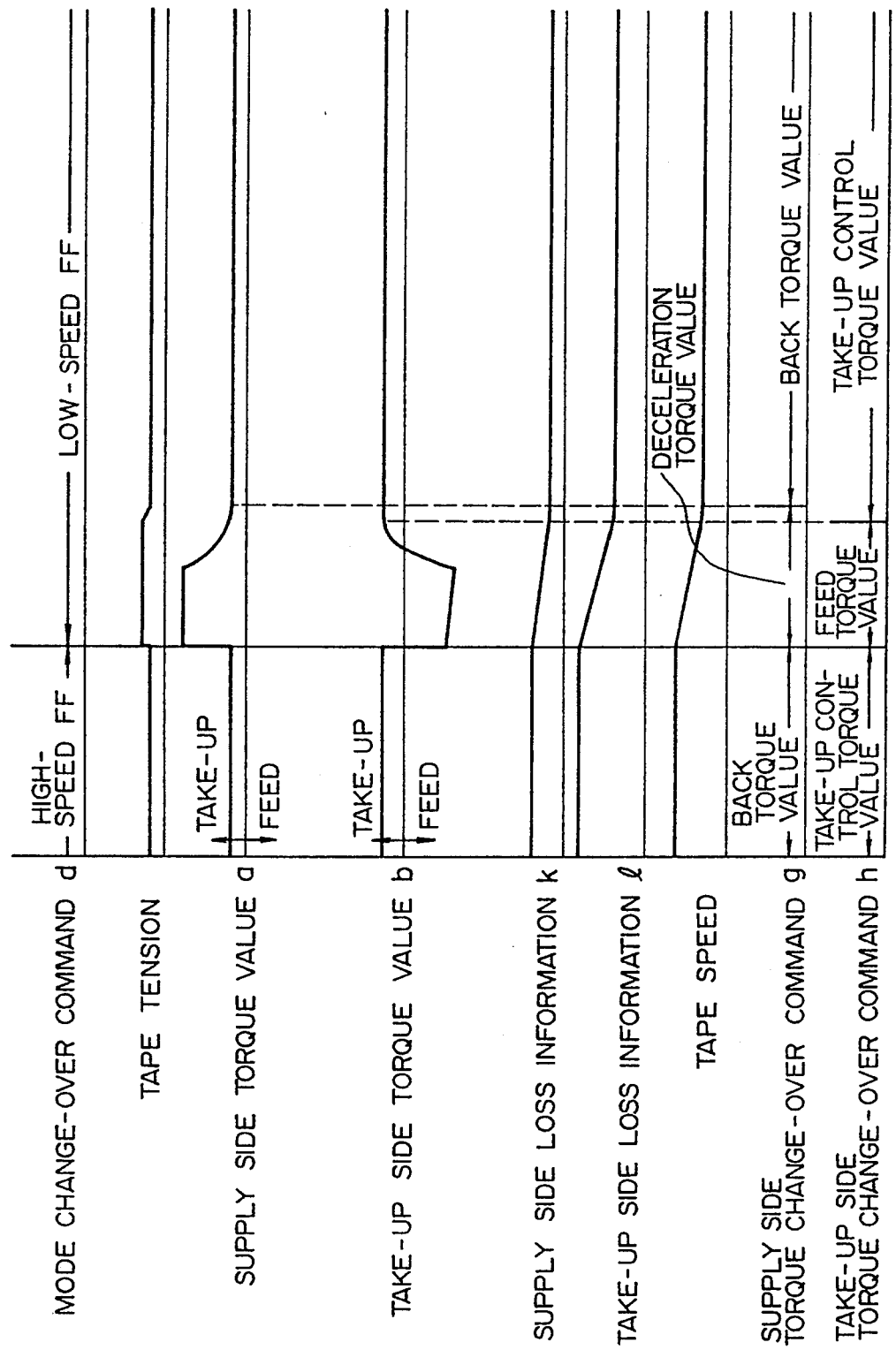
FIG. 15 is a timing chart showing a change in signal of each part in the fifth embodiment.

Thus, as shown in FIG. 15, in the case where a tape radius on the reel in the feed torque generating side is small, a feed torque value of the take-up side torque value b becomes gradually large as a tape speed becomes high. Thereby, the lowering of a tape tension immediately after generation of the feed torque can be prevented and hence a rapid deceleration is made with the tension of the tape 2 being kept at a more stable condition.

According to the present embodiment mentioned above, there are provided a remaining tape radius detecting circuit 7A for determining information of a remaining tape radius on the supply reel, a wound tape radius detecting circuit 7B for determining information of a wound tape radius on the take-up reel, a supply side loss determining circuit 31A for determining supply side loss information k, a take-up side loss determining circuit 31B for determining take-up side loss information l, a coefficient setting circuit 202 for setting a coefficient based on the information of the wound tape radius on the take-up reel, a feed torque value determining circuit 215 for determining a feed torque value based on the coefficient, information of the wound tape radius on the take-up reel, information of a remaining tape radius on the supply reel, a supply side loss information k, a take-up side loss information l and a supply side torque value a, a decision circuit 222 for outputting a supply side torque change-over command g through comparison of a back torque value and a deceleration torque value and a take-up side torque change-over command h through comparison of a take-up control torque value and the feed torque value in accordance with a mode change-over command d, a supply side change-over circuit 232 for outputting the back torque value and the deceleration torque value to the supply reel driving circuit 5A in accordance with the supply side torque change-over command g, and a take-up side change-over circuit 233 for outputting the take-up control torque value or the feed torque value to the take-up reel driving circuit 5B in accordance with the take-up side torque change-over command h, whereby a tape speed can be rapidly decelerated to a goal speed without causing tape damage due to an abnormal tension upon issuance of the mode change-over command d for deceleration, thereby making it possible to improve remarkably the response speed.

Also, a feed torque value determining circuit 215 uses the supply side loss information k and the take-up side loss information l for determination of the feed torque value. Therefore, even in the case where a difference in the tape radii between the supply reel 3A and the take-up reel 3B is large, the tape tension can be kept at a constant value even in the transition state with no occurrence of the slack of the tape, thereby making it possible to realize a stable deceleration operation.

Further, an excellent performance can be realized through a very easy operation by determining the loss information k and l by the loss determining circuits 31A and 31B from a linear function of the rotation speed information of each reel and step-wise setting of the coefficient by a coefficient setting circuit 202 based on the information of the wound tape radius on the take-up reel.

Furthermore, in the present embodiment, all processings are performed on the software of a microcomputer, thereby attaining the effects of circuit size reduction, weight reduction and space saving. If processings have been performed on a software even hitherto, such effects can be realized with no increase in cost and hence the practical value of the present embodiment is very high.

Figure 16:
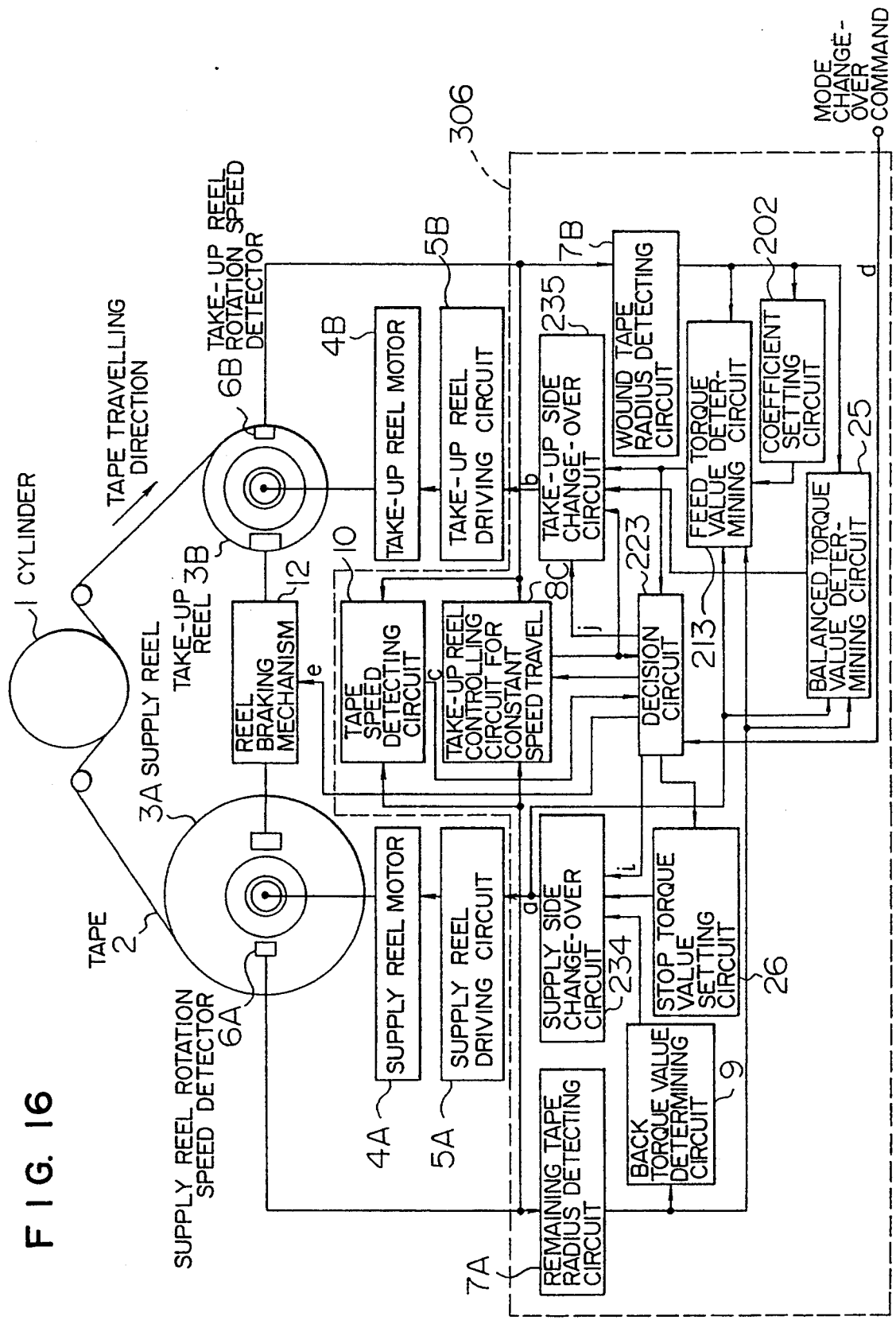
FIG. 16 is a block diagram showing the construction of a tape driving apparatus according to a sixth embodiment of the present invention.

FIG. 16 is a block diagram showing the construction of a tape driving apparatus according to a sixth embodiment of the present invention.

Explanation of the same components in FIG. 16 as those in FIG. 10 will be omitted. In FIG. 16, a balanced torque value determining circuit 25 receives information of the remaining tape radius on the supply reel, information of the wound tape radius on the take-up reel and a supply side torque value a to determine a balanced torque value of an equation which will be shown hereunder. A stop torque value setting circuit 26 outputs in accordance with a command from a decision circuit 223 a first stop torque which is to be applied to the supply reel in order to rapidly decelerate the tape 2 during travel and a second stop torque which is sufficiently smaller than the first stop torque and is to be outputted when a tape speed becomes lower than a predetermined value. The decision circuit 223 produces supply side and take-up side torque change-over commands i and j from a mode change-over command d and tape speed information c outputted from the tape speed detecting circuit 10 to send them to a supply side change-over circuit 234 and a take-up side change-over circuit 235, respectively, and sends a braking command e to a reel braking mechanism 12. The supply side change-over circuit 234 outputs a back torque value or the stop torque value to the supply reel driving circuit 5A in accordance with the supply side torque change-over command i. The take-up side change-over circuit 235 outputs a take-up control torque value, a feed torque value or the balanced torque value to the take-up reel driving circuit 5B in accordance with the take-up side torque change-over command j. The reel braking mechanism 12 brakes the supply reel 3A and the take-up reel 3B in accordance with the braking command e.

Next, explanation will be made of the determination of the balance torque value made by the balance torque value determining circuit 25.

The balanced torque value means a torque value with which a torque generated by the supply reel motor 3A and a torque generated by the take-up reel motor 3B are balanced through the tape 2 so that no acceleration is generated in either direction.

A condition under which no acceleration is exerted on the tape is satisfied by the following equation:

$$F_S = F_T$$

Representing this equation in terms of the tape radii and torques generated by the motors, we obtain $$\frac{T_S}{\gamma_S} = \frac{T_T}{\gamma_T}$$

Accordingly, the determination of the balanced torque value by the balanced torque value determining circuit 25 is made by the following equation:

$$T_T = T_S \cdot \frac{\gamma_T}{\gamma_S} \tag{9}$$

Figure 17C:
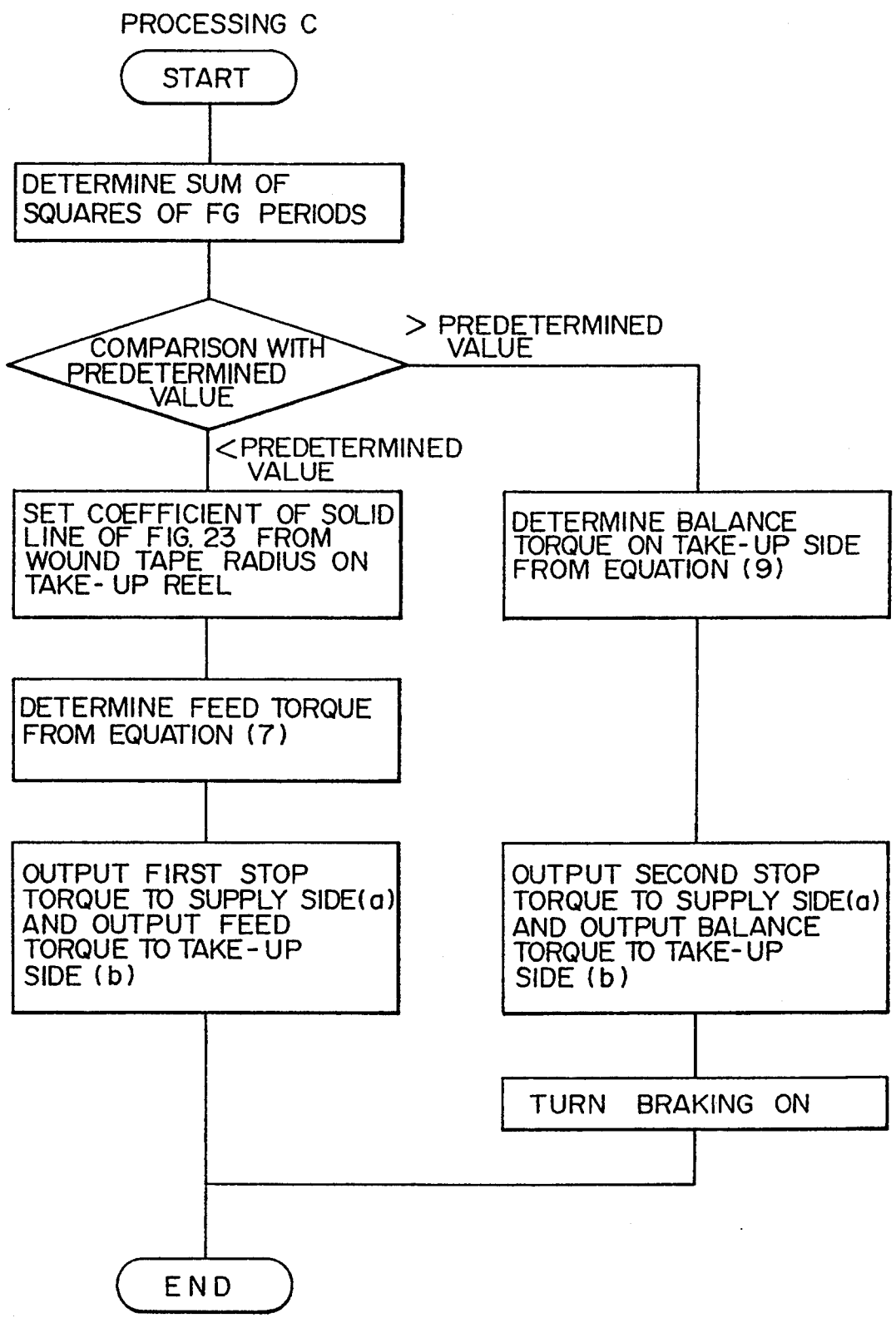

The operation of the tape driving apparatus of the present embodiment having the above construction will now be explained using flow charts shown in FIGS. 17A, 17B and 17C and a timing chart shown in FIG. 18.

In the present embodiment, the whole of a portion 306 enclosed by a dotted line in FIG. 16 is realized in the form of a software running on a microcomputer. The flow charts shown in FIGS. 17A, 17B and 17C are those of the software incorporated in the microcomputer. The timing chart shown in FIG. 18 illustrates temporal changes of the supply side torque value a, the take-up side torque value b, the tape speed information c, the mode change-over command d, the torque changeover commands i and j, the braking command e, and the tape tension at that time.

At the time of stop from a high-speed FF travel, the sum of squares of FG periods is determined and is compared with a predetermined value, as shown by the processing C of FIG. 17. In the case where the sum of squares of FG periods is smaller than the predetermined, a coefficient is set from a supply reel tape radius and a feed torque is determined from the set coefficient, a first stop torque, the supply reel tape radius and a take-up reel tape radius in accordance with equation (7) with a tension ($F_S$) being set to a value slightly higher than that in the normal travel. The feed torque is outputted through a D/A converter to the take-up reel driving circuit 5B while the first stop torque is outputted through a D/A converter to the supply reel driving circuit 5A. On the other hand, in the case where the sum of squares of FG periods is larger than the predetermined value, a balanced torque is determined in accordance with equation (9) from the supply and take-up reel tape radii determined in the processings A and B and a second stop torque value preset, and the balanced torque is outputted through the D/A converter to the take-up reel driving circuit 5B while the second stop torque is outputted through the D/A converter to the supply reel driving circuit 5A. Further, the braking is turned ON in order to stop the rotation of the reels.

Figure 18:
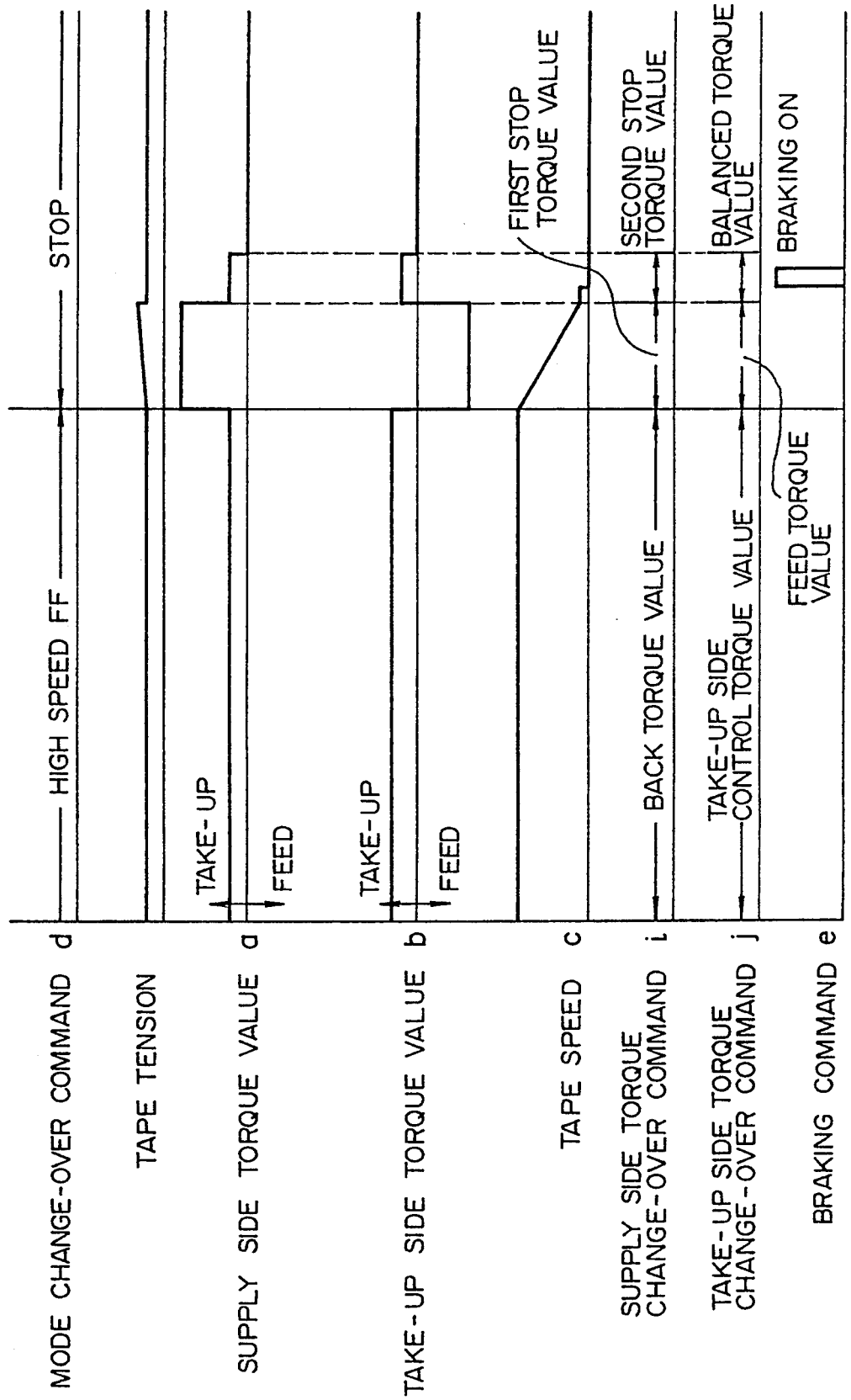
FIG. 18 is a timing chart showing a change in signal of each part in the sixth embodiment.

Thus, at the time of stop, the first stop torque having a large value is applied to the supply reel while the feed torque is applied to the take-up reel, as shown in FIG. 18. Thereby, a rapid deceleration is realized with the tape 2 being kept at a stable condition having a tension value slightly higher than that in the normal travel. When the tape speed c becomes below a predetermined value which is sufficiently low, the acceleration of the tape 2 becomes zero. Accordingly, it is possible to rapidly stop the tape 2 without increasing abnormally the tension when the braking is applied.

According to the present embodiment mentioned above, there are provided the coefficient setting circuit 202 for setting a coefficient based on the information of the tape radius on the take-up reel, the feed torque value determining circuit 213 for determining a feed torque value from the coefficient set by the coefficient setting circuit 202, the information of the wound tape radius on the take-up reel, information of the remaining tape radius on the supply reel and a supply side torque value b, the decision circuit 223 for outputting supply side and take-up side torque change-over commands i and j and a braking command e from a mode change-over command d and tape speed information c, the supply side change-over circuit 234 for outputting a back torque value or a stop torque value to the supply reel driving circuit 5A in accordance with the supply side torque change-over command i, the take-up side change-over circuit 235 for outputting a take-up control torque value, the feed torque value or a balanced torque value to the take-up reel driving circuit 5B in accordance with the take-up side torque change-over command j, and the reel braking mechanism 12 for braking the supply reel 4A and the take-up reel 4B in accordance with the braking command e, whereby the tape 2 can be rapidly stopped without causing tape damage due to an abnormal tension upon issuance of the mode change-over command d for stop.

Also, since the supply reel 3A and the take-up reel 3B are mechanically braked after the tape speed becomes sufficiently low, tape damage caused at that time is small. Further, since the balanced torque value is set such that no acceleration is exerted on the tape, it is possible to brake surely the tape without causing large tape damage even if the reel braking mechanism 12 should break down.

Furthermore, an excellent performance can be realized through a very easy operation by step-wise setting of the coefficient by the coefficient setting circuit 202 based on the information of the wound tape radius on the take-up reel.

In addition, in the present embodiment, all the processings are performed by the software on a microcomputer, thereby attaining such advantages as circuit size reduction, weight reduction and space saving. If all the processings have been performed by software even hitherto, such advantages can be realized with no increase in cost and hence the practical value of the present embodiment is very high.

Figure 19:
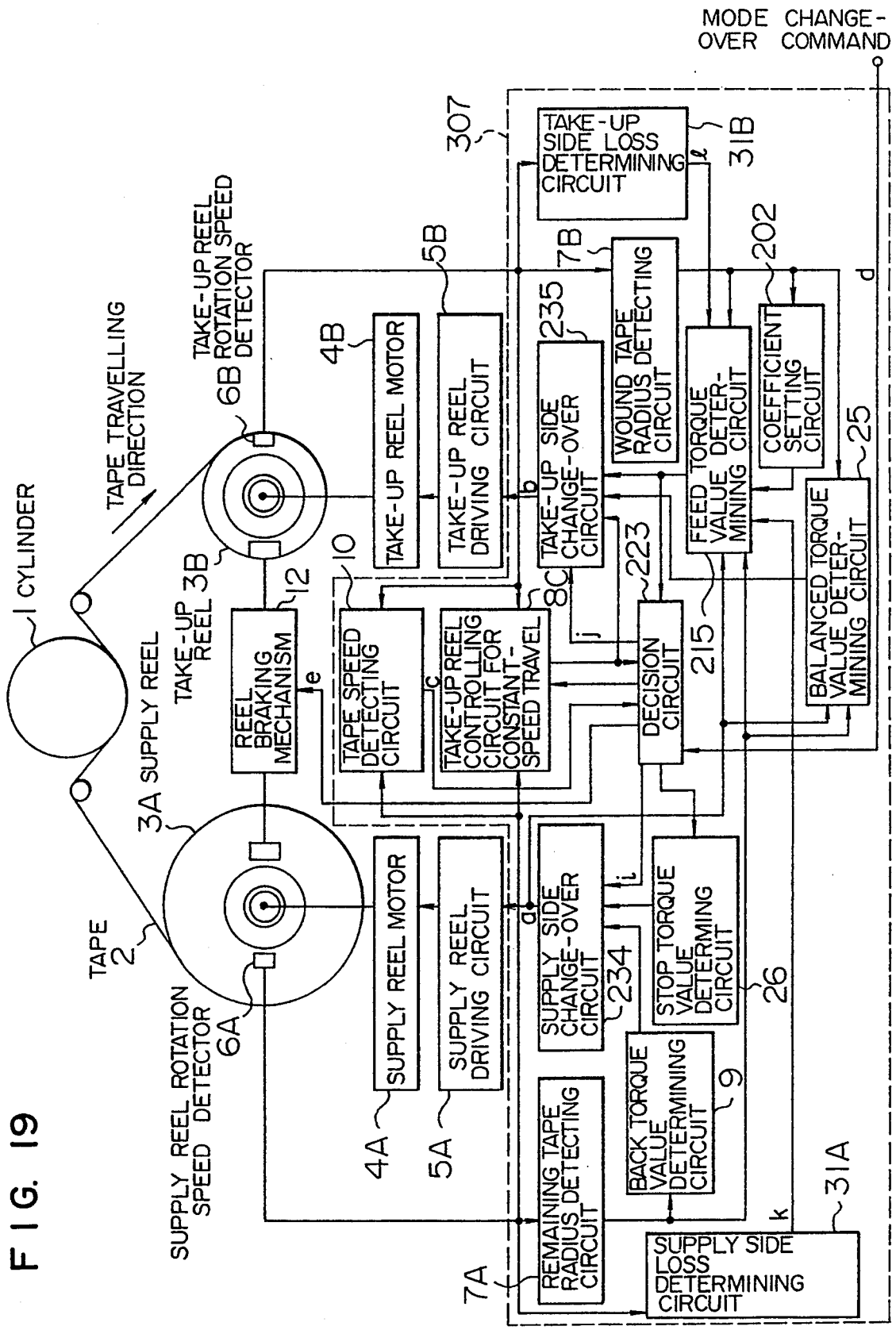
FIG. 19 is a block diagram showing the construction of a tape driving apparatus according to a seventh embodiment of the present invention.

FIG. 19 is a block diagram showing the construction of a tape driving apparatus according to a seventh embodiment of the present invention.

The tape driving apparatus of the present embodiment shown in FIG. 19 is constructed in combination of the components shown in FIG. 16 and the components shown in FIG. 13.

Figure 20A:
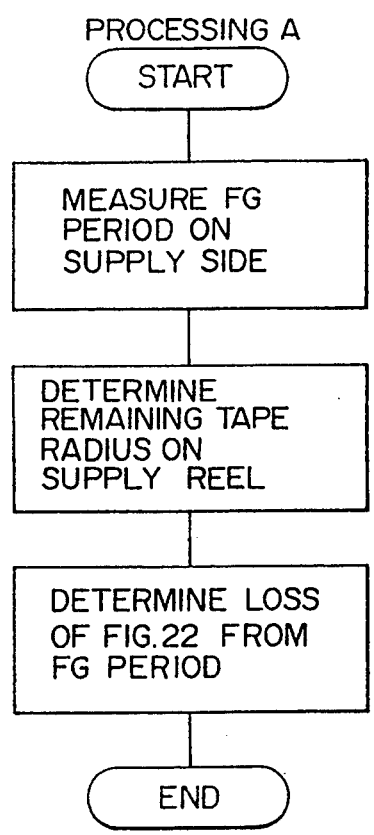
FIGS. 20A, 20B, and 20C show flow charts of a software, incorporated in a microcomputer, which is used in the seventh embodiment.
Figure 20B:
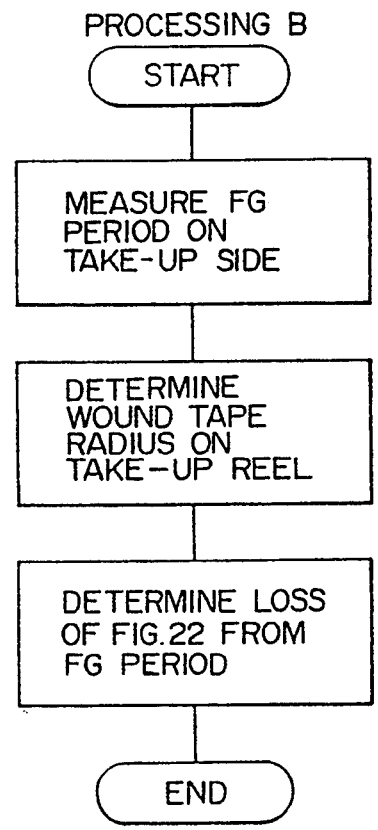
Figure 20C:
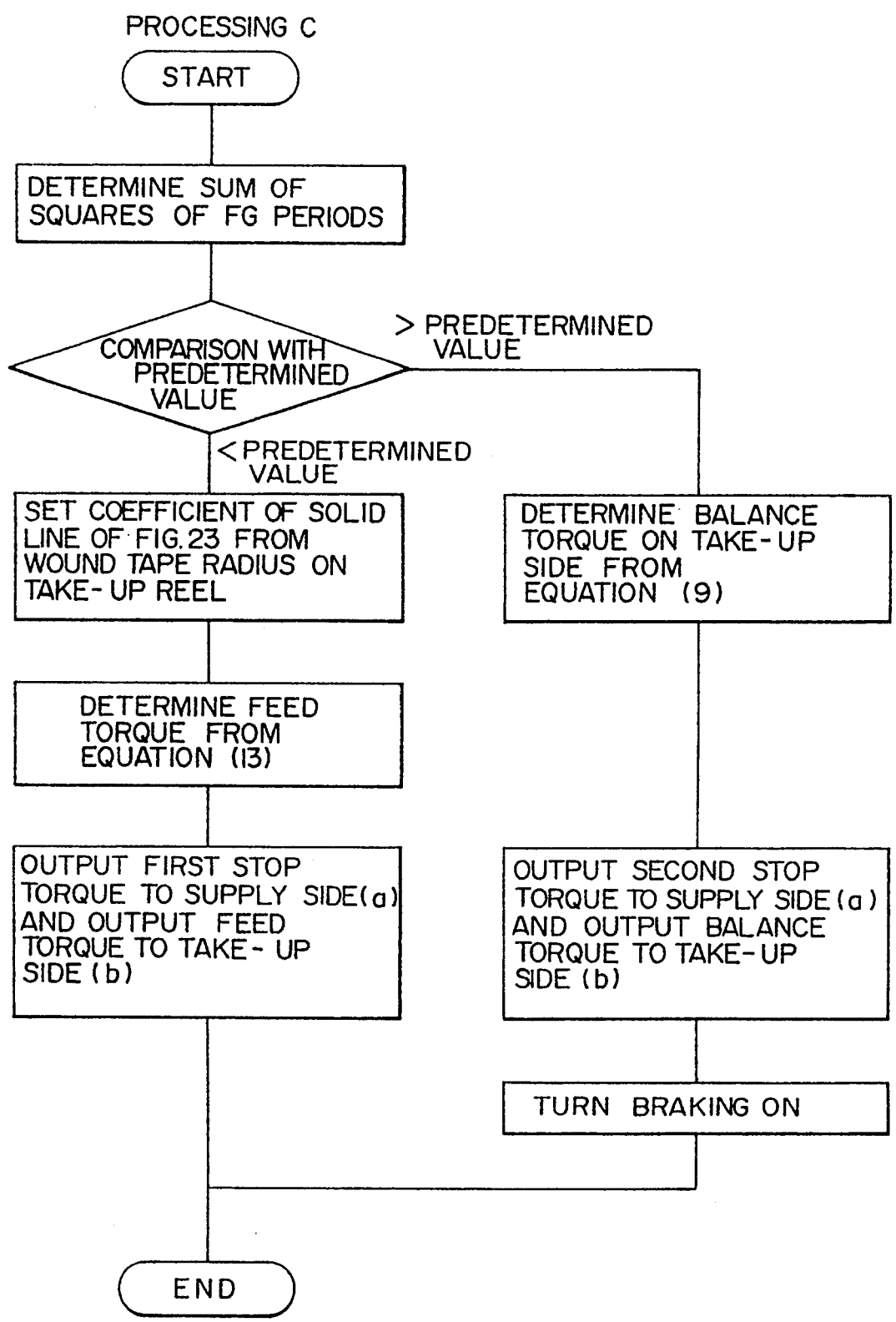

The operation of the tape driving apparatus of the present embodiment having the above construction will now be explained using flow charts shown in FIGS. 20A, 20B and 20C and a timing chart shown in FIG. 21.

In the present embodiment, the whole of a portion 307 is realized in the form of software running on a microcomputer. The flow charts shown in FIGS. 20A, 20B and 20C are those of the software incorporated in the microcomputer. The timing chart shown in FIG. 21 illustrates temporal changes of the supply side torque value a, the take-up side torque value b, the tape speed information c, the mode change-over command d, the torque change-over commands i and j, the braking command e, and the tape tension at that time.

At the time of stopping the tape from a high-speed FF travel, a basic operation is similar to that in the sixth embodiment but each of the processings A and B shown in FIG. 20 additionally includes determining a loss torque conformable to the rotation speed of the reel motor at that time by use of the FG period detected and the processing C additionally includes determining a feed torque from equation (13) by use of the loss torques determined in the processings A and B.

Figure 21:
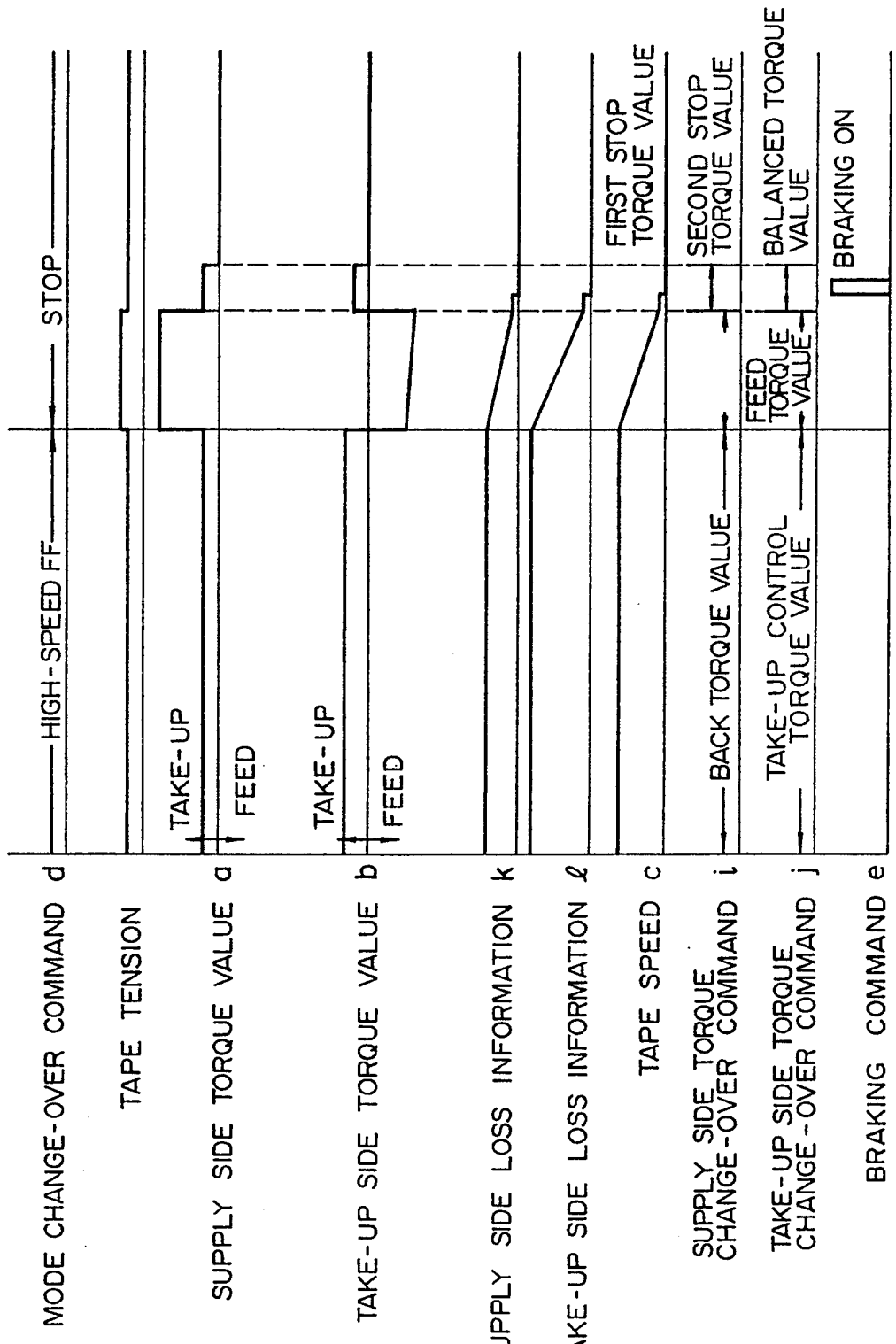
FIG. 21 is a timing chart showing a change in signal of each part in the seventh embodiment.

Thus, in the case where a tape radius on the reel in the feed torque generating side is small, a feed torque value of the take-up side torque value b becomes gradually larger as a tape speed becomes higher, as shown in FIG. 21. Thereby, the lowering of a tape tension immediately after generation of the feed torque can be prevented and hence a rapid stop is made with the tension of the tape 2 being kept at a more stable condition.

According to the present embodiment mentioned above, there are provided the remaining tape radius detecting circuit 7A for determining information of the remaining tape radius on the supply reel, the wound tape radius detecting circuit 7B for determining information of the wound tape radius on the take-up reel, the supply side loss determining circuit 31A for determining supply side loss information k, the take-up side loss determining circuit 31B for determining take-up side loss information l, the coefficient setting circuit 202 for setting a coefficient from the information of the wound tape radius on the take-up reel, the feed torque value determining circuit 215 for determining a feed torque value from the coefficient set by the coefficient setting circuit 202, the information of the wound tape radius on the take-up reel, the information of the remaining tape radius on the supply reel, the supply side loss information k, the take-up side loss information and a supply side torque value b, the decision circuit 223 for outputting supply side and take-up side torque change-over commands i and j and a braking command e from a mode change-over command d and tape speed information c, the supply side change-over circuit 234 for outputting a back torque value or a stop torque value to the supply reel driving circuit 5A in accordance with the supply side torque change-over command i, the take-up side change-over circuit 235 for outputting a take-up control torque value, the feed torque value or a balanced torque value to the take-up reel driving circuit 5B in accordance with the take-up side torque change-over command j, and the reel braking mechanism 12 for braking the supply reel 3A and the take-up reel 3B in accordance with the braking command e, whereby the tape 2 can be rapidly stopped without causing tape damage due to an abnormal tension upon issuance of the mode change-over command d for stop.

Also, since the supply reel 3A and the take-up reel 3B are mechanically braked after the tape speed becomes sufficiently low, tape damage caused at that time is small. Further, since the balanced torque value is set such that no acceleration is exerted on the tape, it is possible to brake surely the tape without causing large tape damage even if the reel braking mechanism 12 should break down.

Furthermore, the feed torque value determining circuit 215 uses the supply side loss information k and the take-up side loss information l for determination of the feed torque value. Therefore, even in the case where a difference in the tape radii between the supply reel 3A and the take-up reel 3b is large, the tape tension can be kept at a constant value even upon transition with no occurrence of the slack of the tape, thereby making it possible to realize a stable stop operation.

In addition, an excellent performance can be realized through a very easy operation by determining the loss information k and l by the loss determining circuits 31A and 31B from a linear function of the rotation speed information of each reel and step-wise setting of the coefficient by the coefficient setting circuit 202 based on the information of the wound tape radius on the take-up reel.

Moreover, in the present embodiment, all processings are performed by the software on a microcomputer, thereby attaining such advantages as circuit size reduction, weight reduction and space saving. If all the processings have been performed by software even hitherto, such advantages can be realized with no increase in cost and hence the practical value of the present embodiment is very high.

Though the software on the microcomputer in the first to seventh embodiments is constructed with the processings A and B which are activated by FG signals respectively generated from the supply reel rotation speed detector 6A and the take-up reel rotation speed detector 6B and the processing C which is ways activated at a constant period, various manners of construction can be considered and hence the construction of the software is not limited to the disclosed embodiments.

Also, in the second, sixth and seventh embodiments, the tape speed detecting circuit 10 uses pulses (FG) outputted from the rotation speed detectors 6a and 6B. However, there can be considered, for example, a method in which a signal is recorded on the tape by means of a fixed head and a tape speed is detected from the period of the signal upon reproduction. Accordingly, the tape speed detecting method is not limited to those embodiments.

I claim:
1. A tape driving apparatus comprising:
driving means for driving a supply reel and a take-up reel, respectively;
remaining tape radius detecting means for detecting information of a tape radius remaining on said supply reel;
wound tape radius detecting means for detecting information of a tape radius wound on said take-up reel;
supply reel controlling means for producing supply side torque information and controlling said supply reel;
take-up torque value determining means for producing take-up torque information of said take-up reel during tape travel at a constant-speed;
coefficient setting means for setting a determining coefficient of feed torque for said take-up reel in accordance with said information of the wound tape radius on said take-up reel or said information of the remaining tape radius on said supply reel;
feed torque value determining means for determining feed torque information of said take-up reel on the basis of said supply side torque information, said information of the remaining tape radius on said supply reel, said information of the wound tape radius on said take-up reel and said determining coefficient of feed torque;
decision means for outputting a torque information change-over signal on the basis of a mode change-over command, said feed torque information and said take-up torque information; and
change-over means for sending either one of said feed torque information and said take-up torque infor- mation to said take-up reel driving means on the basis of said torque information change-over signal.

2. A tape driving apparatus according to claim 1, wherein the coefficient set by said coefficient setting means takes discontinuous values for said information of the remaining tape radius on said supply reel or said information of the wound tape radius on said take-up reel.

3. A tape driving apparatus according to claim 1, further comprising:
   tape speed detecting means for detecting tape speed information; and
   balanced torque value determining means, receiving said information of the remaining tape radius on said supply reel, said information of the wound tape radius on said take-up reel and said supply side torque information, for producing balanced torque information on the take-up side which is calculated by (supply side torque information)×{(information of the wound tape radius on said take-up reel)/(information of the remaining tape radius on said supply reel)}; and wherein:
   said decision means outputs said torque information change-over signal on the basis of said mode change-over command, said tape speed information, said feed torque information and said take-up torque information; and
   said change-over means sends one of said feed torque information, said take-up torque information and said balanced torque information to said take-up reel driving means on the basis of said torque information change-over signal.

4. A tape driving apparatus according to claim 1, wherein the coefficient set by said coefficient setting means takes discontinuous values for said information of the remaining tape radius on said supply reel or said information of the wound tape radius on said take-up reel.

5. A tape driving apparatus according to claim 1, wherein said take-up torque value determining means produces said take-up torque information in accordance with a speed error between a predetermined goal speed and a speed of said supply reel and take-up reel.

6. A tape driving apparatus comprising:
   driving means for driving a supply reel and a take-up reel, respectively;
   tape radius detecting means for detecting information of a tape radius remaining on said supply reel and information of a tape radius wound on said take-up reel, respectively;
   reel speed detecting means for detecting rotation speed information of said supply reel and rotation speed information of said take-up reel, respectively;
   loss determining means for determining information of respective losses in said supply reel driving means and take-up reel driving means on the basis of said rotation speed information of said supply reel and said rotation speed information of said take-up reel, respectively;
   supply reel controlling means for producing supply side torque information and controlling said supply reel;
   take-up torque value determining means for producing take-up torque information of said take-up reel during tape travel at a constant-speed;
   coefficient setting means for setting a determining coefficient of feed torque for said take-up reel in accordance with said information of the wound tape radius on said take-up reel or said information of the remaining tape radius on said supply reel;
   feed torque value determining means for determining feed torque information of said take-up reel on the basis of said supply side torque information, said information of the remaining tape radius on said supply reel, said information of the wound tape radius on said take-up reel, said determining coefficient of feed torque, said loss information of said supply reel driving means and said loss information of said take-up reel driving means;
   decision means for outputting a torque information change-over signal on the basis of a mode change-over command, said feed torque information and said take-up torque information; and
   change-over means for sending either one of said feed torque information and said take-up torque information to said take-up reel driving means on the basis of said torque information change-over signal.

7. A tape driving apparatus according to claim 6, wherein at least one of said loss determining means determines the loss information as a linear function of the rotation speed information of the corresponding reel.

8. A tape driving apparatus according to claim 6, wherein the coefficient set by said coefficient setting means takes discontinuous values for said information of the remaining tape radius on said supply reel or said information of the wound tape radius on said take-up reel.

9. A tape driving apparatus according to claim 6, further comprising:
   tape speed detecting means for detecting tape speed information; and
   balanced torque value determining means, receiving said information of the remaining tape radius on said supply reel, said information of the wound tape radius on said take-up reel and said supply side torque information, for producing balanced torque information on the take-up side which is calculated by (supply side torque information)×{(information of the wound tape radius on said take-up reel)/(information of the remaining tape radius on said supply reel)}; and wherein:
   said decision means outputs said torque information change-over signal on the basis of said mode change-over command, said tape speed information, said feed torque information and said take-up torque information; and
   said change-over means sends one of said feed torque information, said take-up torque information and said balanced torque information to said take-up reel driving means on the basis of said torque information change-over signal.

10. A tape driving apparatus according to claim 9, wherein at least one of said loss determining means determines the loss information as a linear function of the rotation speed information of the corresponding reel.

11. A tape driving apparatus according to claim 10, wherein the coefficient set by said coefficient setting means takes discontinuous values for said information of the remaining tape radius on said supply reel or said information of the wound tape radius on said take-up reel.

12. A tape driving apparatus according to claim 6, wherein said take-up torque value determining means produces said take-up torque information in accordance with a speed error between a predetermined goal speed and a speed of said supply reel and take-up reel.

* * * * *